United States Patent
Borgmann et al.

(10) Patent No.: US 12,054,014 B2
(45) Date of Patent: Aug. 6, 2024

(54) BI-DIRECTIONAL AIR DELIVERY SYSTEM

(71) Applicant: Deere & Company, Moline, IL (US)

(72) Inventors: Benjamin L. Borgmann, Waterloo, IA (US); Patrick A. Schweigel, Cedar Falls, IA (US); Marta A. Muilenburg, Waterloo, IA (US)

(73) Assignee: Deere & Company, Moline, IL (US)

( * ) Notice: Subject to any disclaimer, the term of this patent is extended or adjusted under 35 U.S.C. 154(b) by 719 days.

(21) Appl. No.: 17/184,806

(22) Filed: Feb. 25, 2021

(65) Prior Publication Data

US 2022/0266783 A1     Aug. 25, 2022

(51) Int. Cl.
| | |
|---|---|
| *B60C 23/00* | (2006.01) |
| *B60C 23/16* | (2006.01) |
| *B60R 16/08* | (2006.01) |
| *B60T 13/26* | (2006.01) |
| *B60T 17/00* | (2006.01) |

(52) U.S. Cl.
CPC ...... *B60C 23/00372* (2020.05); *B60C 23/001* (2013.01); *B60C 23/00354* (2020.05); *B60C 23/16* (2013.01); *B60R 16/08* (2013.01); *B60T 13/268* (2013.01); *B60T 17/002* (2013.01);
(Continued)

(58) Field of Classification Search
CPC ........ B60C 23/00354; B60C 23/00372; B60C 23/001; B60C 23/16
See application file for complete search history.

(56) References Cited

U.S. PATENT DOCUMENTS

| | | | |
|---|---|---|---|
| 5,111,762 A | * | 5/1992 | Frangiamore ........... B08B 3/026 114/222 |
| 6,772,812 B1 | | 8/2004 | Carlsson |
| | | | (Continued) |

FOREIGN PATENT DOCUMENTS

| | | |
|---|---|---|
| CN | 203567491 U | 4/2014 |
| DE | 3806322 A1 | 9/1989 |
| | (Continued) | |

OTHER PUBLICATIONS

Fendt, "An In-Depth Look at the New Fendt Momentum Planter," AGCO Corporation, 2020 (16 pages).
(Continued)

*Primary Examiner* — Jason R Bellinger
(74) *Attorney, Agent, or Firm* — Tucker Ellis LLP

(57) ABSTRACT

An air delivery system is operable to on-board compressed air to an associated work vehicle from an associated or auxiliary source such as for example an external large compressor or air storage tank for assisting a tire inflation system (TIS) of the associated work vehicle to expedite tire inflation particularly when transitioning to a desired raised tire pressure, and is further operable to off-board compressed air from a compressor of the TIS system on-board the associated work vehicle for delivery from the TIS to an associated or external compressed air consuming device such as an implement attached with the associated work vehicle or the like. A bi-directional air delivery retrofit kit provides on-boarding and off-boarding of an extra-vehicular compressed air product relative to an associated work vehicle. A dual source air delivery system provides pressurized air to an air storage device from on-board and off-board pressurized air sources.

20 Claims, 9 Drawing Sheets

(52) U.S. Cl.
CPC ......... *B60T 17/004* (2013.01); *B60T 2260/08* (2013.01)

(56) References Cited

U.S. PATENT DOCUMENTS

| | | | |
|---|---|---|---|
| 7,418,989 | B2 | 9/2008 | Ingram |
| 7,517,026 | B1 | 4/2009 | Herbst et al. |
| 9,744,817 | B2 | 8/2017 | Landphair et al. |
| 9,789,739 | B1 | 10/2017 | Hennig |
| 10,166,821 | B2 * | 1/2019 | Hennig .................. B60S 5/04 |
| 10,239,364 | B2 * | 3/2019 | Hennig ............. B60C 23/00336 |
| 10,328,912 | B2 | 6/2019 | Schick et al. |
| 10,465,810 | B2 * | 11/2019 | Ehrlich ............. B60C 23/00354 |
| 10,625,546 | B2 * | 4/2020 | Salzman ................. B60T 13/58 |
| 2017/0080761 | A1 | 3/2017 | King et al. |
| 2017/0299077 | A1 | 10/2017 | Jabcon et al. |
| 2019/0308471 | A1 | 10/2019 | Fiorati et al. |

FOREIGN PATENT DOCUMENTS

| | | |
|---|---|---|
| DE | 10223257 A1 | 12/2003 |
| EP | 3145732 A1 | 3/2017 |

OTHER PUBLICATIONS

German Search Report issued in application No. DE102022200172.9, dated May 25, 2022, 8 pages.

\* cited by examiner

BI-DIRECTIONAL AIR DELIVERY SYSTEM

FIELD OF THE DISCLOSURE

The present disclosure is related to air communication systems and, more particularly, to bi-directional air communication systems for on-boarding and off-boarding an extra-work equipment compressed air product relative to an associated work equipment apparatus. Although the descriptions herein are directed to bi-directional air delivery systems for on-boarding and off-boarding an extra-vehicular compressed air product relative to an associated work vehicle, it is to be appreciated that the claimed invention has a much broader range of applications including as examples, use in stationary machines and in vehicles and apparatus of any type that generate or provide an on-board supply of compressed air that may be off-boarded for auxiliary use and/or that may benefit from additional compressed air on-boarded from an auxiliary source.

BACKGROUND

Many work machines travel along an underlying surface such as a field for example as they perform a work function. Often, the work function includes pulling or pushing implements or the like coupled with the work machine. Alternatively, sometimes the work machine may have cargo that is added onto or removed from the machine as it performs the work function. Regardless of the work function or surface underlying the work machine, it is advantageous to have the machine performing at the highest possible efficiency during the work function to conserve energy and to quickly and efficiently complete the work function. One of the primary factors contributing to the efficiency of the work machine executing the work function is the traction of ground-engaging mechanisms of the work machine against the underlying surface.

The amount of traction between the work machine and the underlying surface is often modified by altering certain conditions of the work machine. For example, a tire pressure of one or more operational tires of the work machine may be altered in order to allow better traction between the work machine and the underlying surface. Tire pressure may be changed as cargo is added onto or removed from the machine as well as when the underlying surface changes.

The ideal operating conditions for these systems depends on the consistency of the underlying surface. In one example, a soft and sandy underlying surface requires low tire pressures to ensure proper traction is achieved for the work function. Alternatively, on a hard underlying surface relatively high tire pressures are utilized to provide an efficient execution of the work function. For this reason many modern work vehicles are equipped with an on-board tire inflation system (TIS) to regulate and control the tire air pressure to desired levels in order to best match the demands of the various operating conditions. The TIS may be an integrated TIS in the sense that it is built into the work vehicle such as for example during manufacture of the vehicle or in the sense that it is adding onto the vehicle after manufacture by vendors of work vehicle sales and/or services.

A typical TIS includes a compressor for generating a pressurized air supply, an air distribution system for porting the pressurized air supply to one or more relevant operational tires of the work vehicle, and a TIS controller device for operating the compressor based on a combination of signals from sensors measuring tire pressure and a pressure set point signal received from another control system on-board the work vehicle or from an operator. The TIS controller device controls compressor operation to generate an appropriate amount of air pressure and flow to result in a desired tire pressure to provide an efficient execution of the work function.

In addition to operational conditions that may change during execution of the underlying work function, it is sometimes desirable to transition the work machine from a soft underlying surface such as from a field that requires relatively low tire pressure to ensure that proper traction is achieved for the work function to a hard underlying surface such as a roadway for transporting the machine wherein relatively high tire pressures are preferred for safe and efficient operation. Although the TIS may be used to increase the tire pressure, TIS compressors are typically designed to perform well within a somewhat narrow operating range for providing modest amounts of air flow to make small incremental changes to the tire air pressure as may be necessary or desired owing to vehicle loading, environmental changes, or the like. Accordingly it might take several minutes to a half hour during the transition from field work to roadway operation to fully inflate the set of often several tires of some large work vehicles before the equipment can be considered to be ready for operation on the hard or paved surface. Accordingly, TIS systems are inadequate for quickly filling tires, particularly when several large volume tires are being used.

In addition to the above, the work function often includes pulling or pushing implements or the like coupled with the work machine. Many implements carry on-board compressors for performing one or more work functions of the implement. Sometimes compressors on these implements are inadequately sized and they also sometimes wear out during use unbeknownst to the operator resulting in inefficiencies and possible wasted production.

It is therefore desirable to provide an air delivery system that is capable of on-boarding compressed air onto a work machine from an associated or auxiliary source such as for example from an external large compressor or air storage tank for assisting a TIS system integrated with the work machine to expedite tire inflation particularly when transitioning to a desired raised tire pressure.

It is further desirable to provide an air delivery system that is capable of off-boarding compressed air from an on-board compressor of a TIS system integrated with the work machine for delivery as may be desired or necessary to an associated or external compressed air consuming device such as an implement or the like.

It is still further desirable to provide a bi-directional air delivery system that is capable of on-boarding compressed air from an associated or auxiliary source such as for example an external large compressor or air storage tank for assisting a TIS system integrated with the work machine to expedite tire inflation particularly when transitioning to a desired raised tire pressure, and that is also capable of off-boarding compressed air from an on-board compressor of a TIS system integrated with the work machine for delivery to an associated or external compressed air consuming device such as an implement or the like that uses pneumatics.

SUMMARY

The embodiments herein provide an air delivery system.
The embodiments herein provide an air delivery system that is capable of on-boarding compressed air for delivery to an associated work vehicle from an associated or auxiliary source such as for example an external large compressor or air storage tank for assisting an integrated TIS system of the associated work vehicle to expedite tire inflation particularly when transitioning to a desired raised tire pressure.

The embodiments herein also provide an air delivery system that is capable of off-boarding compressed air from a compressor of an integrated TIS system on-board an associated work vehicle for delivery from the integrated TIS system to an associated or external compressed air consuming device such as an implement attached with the work vehicle or the like.

Embodiments herein provide an air communication system. In an embodiment the air communication system is configured to on-board compressed air for communication to an associated work vehicle from an associated or auxiliary source such as for example an external large compressor or air storage tank for assisting an integrated TIS system of the associated work vehicle to expedite tire inflation particularly when transitioning to a desired raised tire pressure. In an embodiment the air communication system is configured to off-board compressed air from a compressor of an integrated TIS system on-board an associated work vehicle for delivery from the integrated TIS system to an associated or external compressed air consuming device such as an implement attached with the work vehicle or the like.

The embodiments herein further provide a bi-directional air delivery system.

The embodiments herein provide a bi-directional air delivery system that is capable of on-boarding compressed air to an associated work vehicle from an associated or auxiliary source such as for example an external large compressor or air storage tank for assisting an integrated TIS system of the associated work vehicle to expedite tire inflation particularly when transitioning to a desired raised tire pressure, and that is also capable of off-boarding compressed air from a compressor of an integrated TIS system on-board the associated work vehicle for delivery from the integrated TIS system to an associated or external compressed air consuming device such as an implement attached with the work vehicle or the like.

Embodiments herein provide a bi-directional air communication system. In an embodiment the air communication system is configured to both selectively on-board and selectively off-board compressed air for communication between an operative pneumatic system of an associated work vehicle and an associated or auxiliary air consuming and/or providing system such as for example an external large compressor or air storage tank or an implement attached with the work vehicle or the like.

The embodiments herein still further provide a bi-directional air delivery retrofit kit for providing on-boarding of compressed air to an associated work vehicle from an associated or auxiliary source such as for example an external large compressor or air storage tank for assisting an integrated TIS system of the associated work vehicle to expedite tire inflation particularly when transitioning to a desired raised tire pressure, and that is also capable of providing off-boarding of compressed air from a compressor of an integrated TIS system on-board the associated work vehicle for delivery from the integrated TIS system to an associated or external compressed air consuming device such as an implement attached with the work vehicle or the like.

Various aspects of examples of the disclosure are set out in the claims.

According to an aspect, an air delivery system is provided for off-boarding an extra-vehicular compressed air product relative to an associated work vehicle, wherein the system includes a work vehicle compressor, a tire inflation system, an auxiliary air communication port connection device, and a valve system. The work vehicle compressor is configured to generate a local compressed air supply, the tire inflation system is configured to receive a tire inflation input air supply for distribution to tires of the associated work vehicle, and the auxiliary air communication port connection device is configured to provide a fluid coupling to the air delivery system. The valve system is configured to communicate an extra-vehicular off-boarding air supply from the local compressed air supply to the auxiliary air communication port connection device.

According to a further aspect, an air delivery system is provided for on-boarding an extra-vehicular compressed air product relative to an associated work vehicle, wherein the system includes a work vehicle compressor, a tire inflation system, an auxiliary air communication port connection device, and a valve system. The work vehicle compressor is configured to generate a local compressed air supply, the tire inflation system is configured to receive a tire inflation input air supply for distribution to tires of the associated work vehicle, and the auxiliary air communication port connection device is configured to provide a fluid coupling to the air delivery system. The valve system is configured to communicate an extra-vehicular on-boarding air supply from the auxiliary air communication port connection device to the tire inflation input air supply.

According to yet a further aspect, a bi-directional air delivery system is provided for on-boarding and off-boarding an extra-vehicular compressed air product relative to an associated work vehicle, wherein the system includes a work vehicle compressor, a tire inflation system, an auxiliary air communication port connection device, and a bi-directional valve system. The work vehicle compressor is configured to generate a local compressed air supply, the tire inflation system is configured to receive a tire inflation input air supply for distribution to tires of the associated work vehicle, and the auxiliary air communication port connection device is configured to provide a fluid coupling to the bi-directional air delivery system. The bi-directional valve system is configured to communicate an extra-vehicular off-boarding air supply from the local compressed air supply to the auxiliary air communication port connection device, and also to communicate an extra-vehicular on-boarding air supply from the auxiliary air communication port connection device to the tire inflation input air supply.

According to another aspect, a bi-directional air delivery retrofit kit is provided for supplying on-boarding and off-boarding of an extra-vehicular compressed air product relative to an associated work vehicle.

According to still yet another aspect, a dual source air delivery system is provided use with an associated work vehicle for filling storage device of a TIS with pressurized air from both on-board and off-board sources.

In accordance with a first aspect, a bi-directional air delivery system is provided for on-boarding and off-boarding an extra-vehicular compressed air product relative to an associated work vehicle, wherein the system comprises a work vehicle compressor configured to generate a local compressed air supply, a tire inflation system configured to receive a tire inflation input air supply for distribution to tires of the associated work vehicle, an auxiliary air communication port connection device configured to provide a fluid coupling to the bi-directional air delivery system, and a bi-directional valve system configured to communicate an extra-vehicular off-boarding air supply from the local compressed air supply to the auxiliary air communication port connection device, and an extra-vehicular on-boarding air supply from the auxiliary air communication port connection device to the tire inflation input air supply.

In any of the embodiments herein, the work vehicle compressor of the bi-directional air delivery system may be configured to be mounted on the associated work vehicle and to compress a first supply of air and to output the local compressed air supply via an on-board compressed air source connection line, and the tire inflation system of the bi-directional air delivery system may be configured to be mounted on the associated work vehicle and to regulate an air pressure within one or more tires of the associated work vehicle by selectively increasing and decreasing the air pressure within the one or more tires of the associated work vehicle, wherein the tire inflation system is configured to distribute to the one or more tires of the associated work vehicle the tire inflation input air supply received by the tire inflation system via a tire inflation connection line, and the auxiliary air communication port connection device of the bi-directional air delivery system may be configured to be mounted on the associated work vehicle and to selectively couple the bi-directional air delivery system with one or more associated compressed air processing apparatus for communicating the extra-vehicular compressed air product between the bi-directional air delivery system and the one or more associated compressed air processing apparatus, and the bi-directional valve system of the bi-directional air delivery system may be is fluidly coupled on a first end via an inner air communication connection line with the on-board compressed air source connection line and with the tire inflation connection line, and fluidly coupled on a second end via an outer air communication connection line with the auxiliary air communication port connection device, wherein the bi-directional valve system is operable to selectively fluid couple the inner air communication connection line with the outer air communication connection line responsive to a bi-directional valve system control signal to permit the local compressed air supply to be delivered via the auxiliary air communication port connection device to the associated compressed air processing apparatus as the extra-vehicular off-boarding air supply, and the auxiliary air communication port connection device being supplied the extra-vehicular on-boarding air supply from the associated compressed air processing apparatus for delivery to the tire inflation system.

In any of the embodiments herein, the bi-directional valve system of the bi-directional air delivery system may comprise a selector valve device responsive to the bi-directional valve system control signal to transition between a first configuration closing a flow between the inner air communication connection line and the outer air communication connection line and a second configuration opening the flow between the inner air communication connection line and the outer air communication connection line to permit the local compressed air supply to be delivered via the auxiliary air communication port connection device to an associated compressed air consuming apparatus as the extra-vehicular off-boarding air supply, and a check valve permitting a unidirectional on-boarding air flow from the outer air communication connection line to the inner air communication connection line for delivery of the extra-vehicular on-boarding air supply from an associated compressed air producing apparatus to the tire inflation system.

In any of the embodiments herein, the selector valve device of the bi-directional air delivery system may comprise a manual selector valve device operable in response to a position of a manual actuator device to transition the manual selector valve device between the first and second configurations.

In any of the embodiments herein, the selector valve device of the bi-directional air delivery system may comprise an electric selector valve device operable in response to an electric control signal to transition the electric selector valve device between the first and second configurations.

In any of the embodiments herein, the bi-directional air delivery system comprises an air conditioning system may be operable to condition the extra-vehicular on-boarding air supply flowing through one or more of the tire inflation connection line, the inner air communication connection line, and/or the outer air communication connection line by one or more of filtering the extra-vehicular on-boarding air supply to impede ingress of an undesirable material into the tire inflation system, and/or adding a supplemental material into the extra-vehicular on-boarding air supply.

In any of the embodiments herein, the air conditioning system of the bi-directional air delivery system may comprise an air dryer operable to remove moisture from the extra-vehicular on-boarding air supply flowing through one or more of the tire inflation connection line, the inner air communication connection line, and/or the outer air communication connection line, wherein the air dryer may comprise one or more of a liquid separator device, and/or a coalescing filter device.

In any of the embodiments herein, the bi-directional valve system of the bi-directional air delivery system may comprise an on-boarded air pressure relief valve in fluid communication with one or more of the tire inflation connection line, the inner air communication connection line, and/or the outer air communication connection line, wherein the on-boarded air pressure relief valve may be operable to limit pressure within the one or more of the tire inflation connection line, the inner air communication connection line, and/or the outer air communication connection line to less than a predetermined on-boarded air pressure limit.

In any of the embodiments herein, the bi-directional air delivery system may comprise a junction connection device fluid coupling the on-board compressed air source connection line with the tire inflation and inner air communication connection lines.

In any of the embodiments herein, the bi-directional air delivery system may comprise a charging valve device disposed in the on-board compressed air source connection line between the junction connection device and the work vehicle compressor, wherein the charging valve device may comprise a forward pressure relief portion operable to prevent a flow of air having a pressure less than a predetermined pressure level through the charging valve device towards the tire inflation junction connection device, and a reverse flow check valve portion operable to prevent a flow of air through the charging valve device towards the work vehicle compressor.

In any of the embodiments herein, the bi-directional air delivery system may comprise a work vehicle air trailer brake system receiving pressurized air from the work vehicle compressor, wherein the work vehicle air trailer brake system may be fluidly coupled with the on-board compressed air source connection line between the work vehicle compressor and the charging valve device, and wherein the fluid coupling of the work vehicle air trailer brake system with the on-board compressed air source connection line between the work vehicle compressor and the charging valve device may ensure a priority of delivery of the local compressed air supply generated by the work vehicle compressor to the work vehicle air trailer brake system above delivery to the tire inflation system for distribution to tires of the associated work vehicle, and/or the bi-directional valve system for communication as the extra-vehicular off-boarding air supply via the auxiliary air communication port connection device.

In accordance with a second aspect, a bi-directional air delivery retrofit kit is provided for providing on-boarding and off-boarding of an extra-vehicular compressed air product relative to an associated work vehicle including a work vehicle compressor configured to compress a first supply of air and to output a local compressed air supply via an on-board compressed air source connection line, and a tire inflation system configured to regulate an air pressure within one or more tires of the associated work vehicle by selectively increasing and decreasing the air pressure within the one or more tires of the associated work vehicle and to distribute to the one or more tires of the associated work vehicle a tire inflation input air supply received by the tire inflation system via a tire inflation connection line, the retrofit kit comprising a junction connection device configured to be selectively coupled with the on-board compressed air source connection line and the tire inflation connection line, an auxiliary air communication port connection device configured to be mounted on the associated work vehicle and to selectively couple the retrofit kit with one or more associated compressed air processing apparatus for communicating an extra-vehicular compressed air product between the retrofit kit and the one or more associated compressed air processing apparatus, and a bi-directional valve system fluidly coupled on a first end via an inner air communication connection line with the junction connection device, and fluidly coupled on a second end via an outer air communication connection line with the auxiliary air communication port connection device, wherein the bi-directional valve system is operable to selectively fluid couple the inner air communication connection line with the outer air communication connection line responsive to a bi-directional valve system control signal to permit the local compressed air supply to be delivered via the auxiliary air communication port connection device to the associated compressed air processing apparatus as an extra-vehicular off-boarding air supply, and the auxiliary air communication port connection device being supplied an extra-vehicular on-boarding air supply from the associated compressed air processing apparatus for delivery to the tire inflation system.

In any of the embodiments herein, the bi-directional valve system of the bi-directional retrofit kit may comprise a selector valve device responsive to the bi-directional valve system control signal to transition between a first configuration closing a flow between the inner air communication connection line and the outer air communication connection line and a second configuration opening the flow between the inner air communication connection line and the outer air communication connection line to permit the local compressed air supply to be delivered via the auxiliary air communication port connection device to an associated compressed air consuming apparatus as the extra-vehicular off-boarding air supply, and the bi-directional valve system of the bi-directional retrofit kit may comprise a check valve permitting a unidirectional on-boarding air flow from the outer air communication connection line to the inner air communication connection line for delivery of the extra-vehicular on-boarding air supply from an associated compressed air producing apparatus to the tire inflation system.

In any of the embodiments herein, the selector valve device of the bi-directional retrofit kit may comprise a manual selector valve device operable in response to a position of a manual actuator device to transition the manual selector valve device between the first and second configurations.

In any of the embodiments herein, the selector valve device of the bi-directional retrofit kit may comprise an electric selector valve device operable in response to an electric control signal to transition the electric selector valve device between the first and second configurations.

In any of the embodiments herein, the bi-directional retrofit kit may comprise an air conditioning system operable to condition the extra-vehicular on-boarding air supply flowing through one or more of the tire inflation connection line, the inner air communication connection line, and/or the outer air communication connection line by one or more of filtering the extra-vehicular on-boarding air supply to impede ingress of an undesirable material into the tire inflation system, and/or adding a supplemental material into the extra-vehicular on-boarding air supply.

In any of the embodiments herein, the air conditioning system of the bi-directional retrofit kit may comprise an air dryer operable to remove moisture from the extra-vehicular on-boarding air supply flowing through one or more of the tire inflation connection line, the inner air communication connection line, and/or the outer air communication connection line, wherein the air dryer comprises one or more of a liquid separator device, and/or a coalescing filter device.

In any of the embodiments herein, the bi-directional valve system of the bi-directional retrofit kit may comprise an on-boarded air pressure relief valve in fluid communication with one or more of the tire inflation connection line, the inner air communication connection line, and/or the outer air communication connection line, wherein the on-boarded air pressure relief valve may be operable to limit pressure within the one or more of the tire inflation connection line, the inner air communication connection line, and/or the outer air communication connection line to less than a predetermined on-boarded air pressure limit.

In accordance with a third aspect, a dual source air delivery system is provided for use with an associated work vehicle, wherein the dual source air delivery system comprises a work vehicle compressor configured to be mounted on the associated work vehicle and to compress a first supply of air and to output a local compressed air supply via an on-board compressed air source connection line, a tire inflation system configured to be mounted on the associated work vehicle and to regulate an air pressure within one or more tires of the associated work vehicle by selectively increasing and decreasing the air pressure within the one or more tires of the associated work vehicle, wherein the tire inflation system is configured to distribute to the one or more tires of the associated work vehicle a tire inflation input air supply received by the tire inflation system via a tire inflation connection line, an auxiliary air communication port connection device configured to be mounted on the associated work vehicle and to selectively couple the dual source air delivery system with an associated compressed air producing apparatus for communicating an extra-vehicular compressed air product from the associated compressed air producing apparatus to the dual source air delivery system, a pressurized air storage device fluidly coupled with the tire inflation connection line, the pressurized air storage device being operable to store compressed air received by the pressurized air storage device, and to pay out the stored compressed air to the tire inflation system for selective distribution to the one or more tires of the associated work vehicle as the tire inflation input air supply, a fluid junction operatively fluidly coupled with the on-board compressed air source connection line with the tire inflation connection line, and a rapid on-boarding control valve system fluidly coupled on a first end via an inner air communication connection line with the fluid junction, and fluidly coupled on a second end via an outer air communication connection line with the auxiliary air communication port connection device, wherein the rapid on-boarding control valve system is operable to selectively fluid couple the inner air communication connection line with the outer air communication connection line responsive to the auxiliary air communication port connection device being supplied an extra-vehicular on-boarding air supply from the associated compressed air processing apparatus for delivery to the tire inflation system, wherein the rapid on-boarding control valve system comprises a check valve permitting a unidirectional on-boarding air flow from the outer air communication connection line to the inner air communication connection line for delivery of the extra-vehicular on-boarding air supply from the associated compressed air producing apparatus to the tire inflation system, and an on-boarded air pressure relief valve in operative fluid communication with one or more of the tire inflation connection line, the inner air communication connection line, and/or the outer air communication connection line, wherein the on-boarded air pressure relief valve is operable to limit pressure within the one or more of the tire inflation connection line, the inner air communication connection line, and/or the outer air communication connection line to less than a predetermined on-boarded air pressure limit.

In any of the embodiments herein, the dual source air delivery system may comprise a charging valve device disposed in the on-board compressed air source connection line between the junction connection device and the work vehicle compressor, and an air conditioning system, wherein the charging valve device may comprise a forward pressure relief portion operable to prevent a flow of air having a pressure less than a predetermined pressure level through the charging valve device towards the tire inflation junction connection device, and a reverse flow check valve portion operable to prevent a flow of air through the charging valve device towards the work vehicle compressor, and wherein the air conditioning system may be operable to condition the extra-vehicular on-boarding air supply flowing through one or more of the tire inflation connection line, the inner air communication connection line, and/or the outer air communication connection line by one or more of filtering the extra-vehicular on-boarding air supply to impede ingress of an undesirable material into the tire inflation system, and/or adding a supplemental material into the extra-vehicular on-boarding air supply.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

DETAILED DESCRIPTION

The following describes one or more example embodiments of the disclosed bi-directional air delivery system for work vehicles, as shown in the accompanying figures of the drawings described briefly above. Various modifications to the example embodiments may be contemplated by one of skill in the art.

Figure 1:
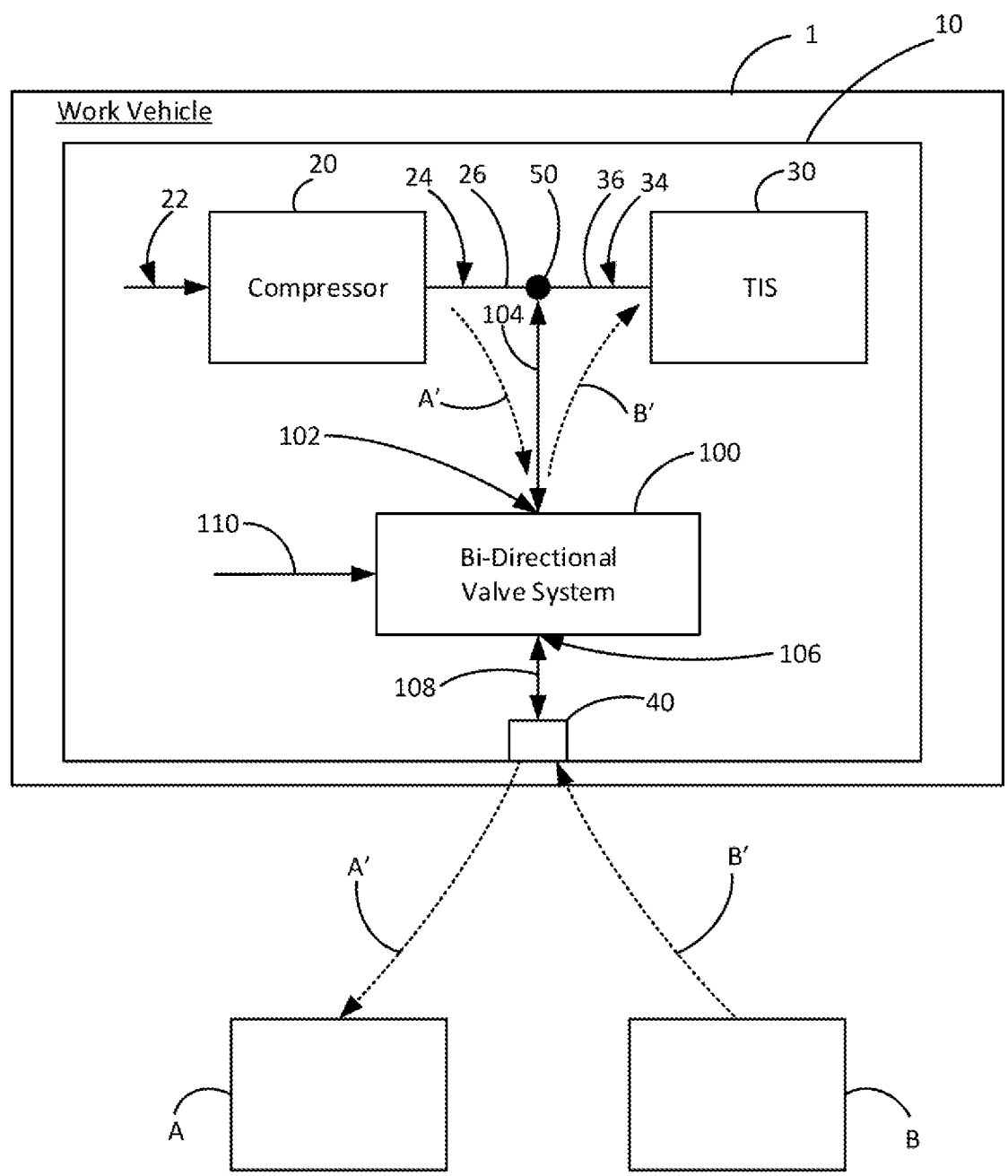
FIG. 1 is a schematic perspective illustration showing a bi-directional air delivery system in accordance with an example embodiment.

FIG. 1 shows a bi-directional air delivery system 10 for on-boarding and off-boarding an extra-vehicular compressed air product relative to an associated work vehicle 1 in accordance with an example embodiment. As shown there, the bi-directional air delivery system 10 includes a work vehicle compressor 20, a tire inflation system 30, an auxiliary air communication port connection device 40, and a bi-directional valve system 100. The work vehicle compressor 20 is configured to generate a local compressed air supply 24, the tire inflation system 30 is configured to receive a tire inflation input air supply 34 for distribution to tires of the associated work vehicle 1, and the auxiliary air communication port connection device 40 is configured to provide a fluid coupling to the bi-directional air delivery system 10. The bi-directional air delivery system 10 is configured to communicate an extra-vehicular off-boarding air supply A' from the local compressed air supply 24 to the auxiliary air communication port connection device 40, and also to communicate an extra-vehicular on-boarding air supply B' from the auxiliary air communication port connection device 40 to the tire inflation input air supply 34.

In accordance with the example embodiment shown, the work vehicle compressor 20 is configured to be mounted on the associated work vehicle 1 and to compress a first supply of air 22 and to output the local compressed air supply 24 via an on-board compressed air source connection line 26. Further in accordance with the example embodiment, the tire inflation system 30 is also configured to be mounted on the associated work vehicle 1 and is configured to regulate an air pressure within one or more tires of the associated work vehicle 1 by selectively increasing and decreasing the air pressure within the one or more tires of the associated work vehicle 1. The tire inflation system 30 is configured to distribute to the one or more tires of the associated work vehicle 1 the tire inflation input air supply 34 received by the tire inflation system 30 via a tire inflation connection line 36.

Further in accordance with the example embodiment, the auxiliary air communication port connection device 40 is also configured to be mounted on the associated work vehicle 1 and also to selectively couple the bi-directional air delivery system 10 with one or more associated compressed air processing apparatus A, B for communicating the extra-vehicular compressed air product A', B' between the bi-directional air delivery system 10 and the one or more associated compressed air processing apparatus A, B.

The bi-directional valve system 100 of the example embodiment illustrated is fluidly coupled on a first end 102 via an inner air communication connection line 104 with a junction connection device 50. In the example illustrated, the junction connection device 50 is in turn in fluid communication with the on-board compressed air source connection line 26 and also in fluid communication with the tire inflation connection line 36. The bi-directional valve system 100 is fluidly coupled on a second end 106 via an outer air communication connection line 108 with the auxiliary air communication port connection device 40.

The bi-directional valve system 100 of the example embodiment is operable in a first mode of operation to selectively fluid couple the inner air communication connection line 104 with the outer air communication connection line 108 responsive to a bi-directional valve system control signal 110 to permit the local compressed air supply 24 to be delivered via the auxiliary air communication port connection device 40 to the associated compressed air processing apparatus A, B as the extra-vehicular off-boarding air supply A'. Accordingly, a desirable technical effect of the bi-directional air delivery system of the example embodiment is that it provides off-boarding of compressed air from an on-board compressor of a TIS system integrated with the work machine for delivery to an associated or external compressed air consuming device such as an implement or the like that uses pneumatics.

The bi-directional valve system 100 of the example embodiment is further operable in a second mode of operation to selectively fluid couple the inner air communication connection line 104 with the outer air communication connection line 108 responsive to the auxiliary air communication port connection device 40 being supplied the extra-vehicular on-boarding air supply B' from the associated compressed air processing apparatus A, B for delivery to the tire inflation system 30. Preferably, the bi-directional valve system 100 of the example embodiment is controlled or otherwise prevented from operating in both of the first and second modes of operation simultaneously. Accordingly, a desirable technical effect of the bi-directional air delivery system of the example embodiment is that it provides on-boarding of compressed air from an associated or auxiliary source such as for example an external large compressor or air storage tank for assisting a TIS system integrated with the work machine to expedite tire inflation particularly when transitioning to a desired raised tire pressure. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Figure 2:
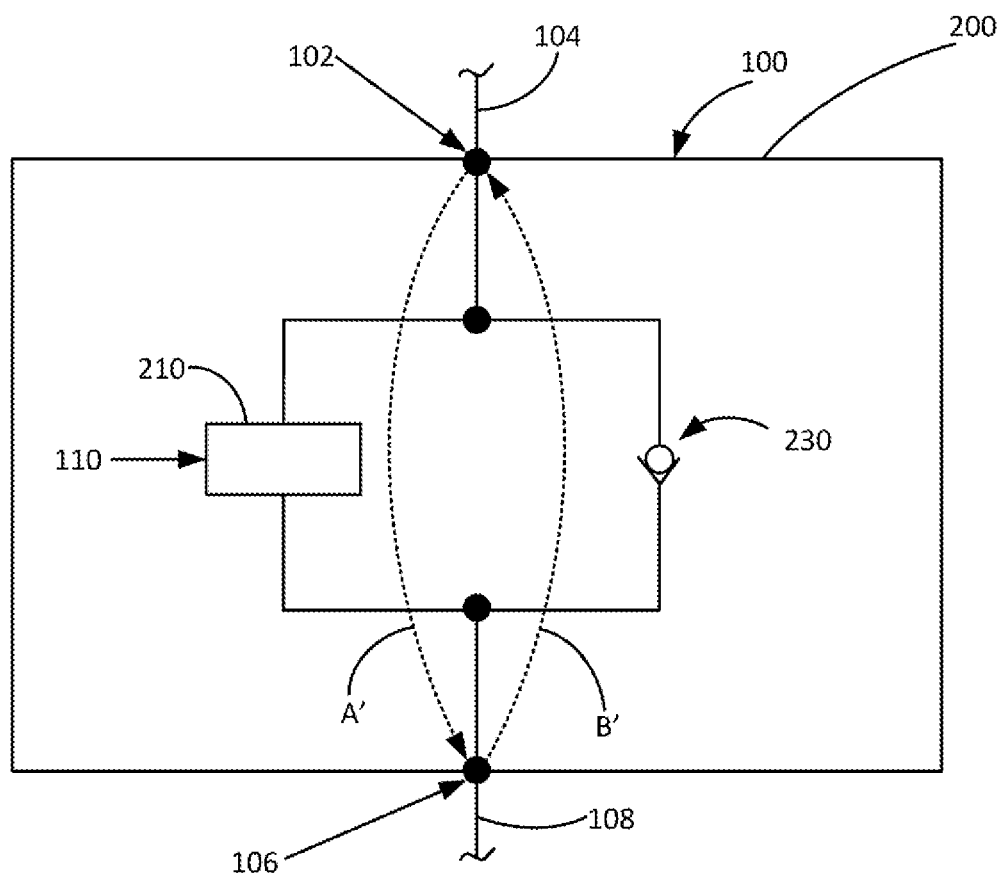
FIG. 2 is a schematic illustration showing an example embodiment of the bi-directional valve system portion of the bi-directional air delivery system of FIG. 1.

FIG. 2 shows an example bi-directional valve system 200 embodiment of the bi-directional valve system 100 portion of the bi-directional air delivery system 10 of FIG. 1. It is to be appreciated that the bi-directional valve system 200 of the example embodiment illustrated is fluidly coupled on a first end 102 via an inner air communication connection line 104 with a junction connection device 50 (FIG. 1), and is further fluidly coupled on a second end 106 via an outer air communication connection line 108 with the auxiliary air communication port connection device 40 (FIG. 1). With particular reference to FIG. 2, the bi-directional valve system 200 comprises a selector valve device 210 and a check valve 230. In the example embodiment illustrated, the selector valve device 210 is responsive to the bi-directional valve system control signal 110 to transition between a first configuration closing a flow between the inner air communication connection line 104 and the outer air communication connection line 108 and a second configuration opening the flow between the inner air communication connection line 104 and the outer air communication connection line 108 to permit the local compressed air supply 24 to be delivered via the auxiliary air communication port connection device 40 to an associated compressed air consuming apparatus A (FIG. 1) as the extra-vehicular off-boarding air supply A'.

Further in the example embodiment illustrated, the check valve 230 of the bi-directional valve system 200 permits a unidirectional on-boarding air flow from the outer air communication connection line 108 to the inner air communication connection line 104 for delivery of the extra-vehicular on-boarding air supply B' from an associated compressed air producing apparatus B (FIG. 1) to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Figure 3:
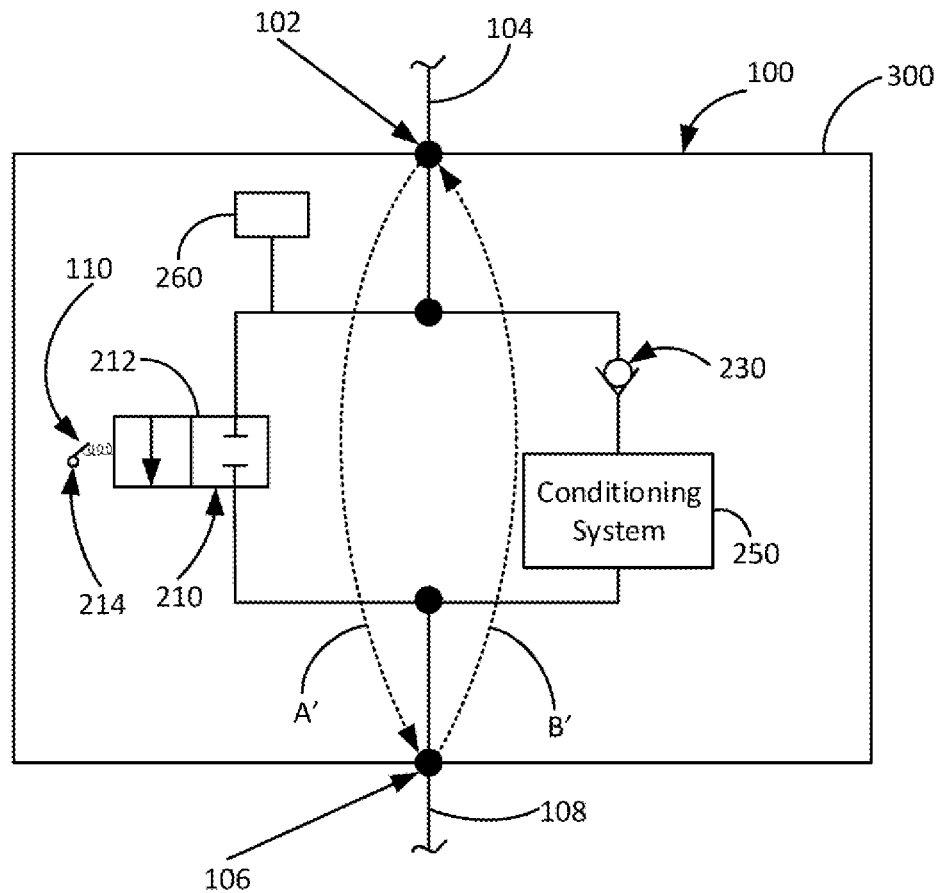
FIG. 3 is a schematic illustration showing a further example embodiment of the bi-directional valve system portion of the bi-directional air delivery system of FIGS. 1 and 2.

FIG. 3 is a schematic illustration showing a further example bi-directional valve system 300 embodiment of the bi-directional valve system 100 portion of the bi-directional air delivery system 10 of FIG. 1. It is to be appreciated that the bi-directional valve system 300 of the example embodiment illustrated is fluidly coupled on a first end 102 via an inner air communication connection line 104 with a junction connection device 50 (FIG. 1), and is further fluidly coupled on a second end 106 via an outer air communication connection line 108 with the auxiliary air communication port connection device 40 (FIG. 1). With particular reference to FIG. 3, the selector valve device 210 of the bi-directional valve system 300 of the embodiment comprises a manual selector valve device 212 operable in response to a bi-directional valve system control signal 110 in the form of a position of a manual actuator device 214 to transition the manual selector valve device 212 between the first and second configurations. In the example embodiment illustrated, the manual selector valve device 212 is responsive to the position of the manual actuator device 214 to transition between a first configuration closing a flow between the inner air communication connection line 104 and the outer air communication connection line 108 and a second configuration opening the flow between the inner air communication connection line 104 and the outer air communication connection line 108 to permit the local compressed air supply 24 to be delivered via the auxiliary air communication port connection device 40 to an associated compressed air consuming apparatus A (FIG. 1) as the extra-vehicular off-boarding air supply A'.

Further in the example embodiment illustrated, the check valve 230 of the bi-directional valve system 300 permits a unidirectional on-boarding air flow from the outer air communication connection line 108 to the inner air communication connection line 104 for delivery of the extra-vehicular on-boarding air supply B' from an associated compressed air producing apparatus B (FIG. 1) to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Further in the example embodiment illustrated, the bi-directional valve system 300 of the of the system 10 includes an air conditioning system 250 operable to condition the extra-vehicular on-boarding air supply B' flowing through one or more of the tire inflation connection line 36, the inner air communication connection line 104, and/or the outer air communication connection line 108. The air conditioning system 250 may condition the extra-vehicular on-boarding air supply B' for example by filtering the extra-vehicular on-boarding air supply B' to impede ingress of one or more undesirable materials into the tire inflation system 30. Such undesirable materials may include for example moisture and/or other contaminants. The air conditioning system 250 may further condition the extra-vehicular on-boarding air supply B' for example by adding a supplemental material into the extra-vehicular on-boarding air supply B'. Such supplemental materials may include for example sealants that may be useful to help to maintaining pressure within the tires of the associated work vehicle and/or to help maintain the integrity of joints, seals or the like of the TIS 30. Such supplemental materials may further include for example lubricants, solvents, cleaners or the like that may be useful in helping to maintain the TIS 30 and/or the tires of the work vehicle. In further example embodiments the air conditioning system 250 may condition the extra-vehicular on-boarding air supply B' for example by both filtering the extra-vehicular on-boarding air supply B' to impede the ingress of one or more undesirable materials into the tire inflation system 30, and adding a supplemental material into the extra-vehicular on-boarding air supply B'.

Yet still further in the example embodiment illustrated, the bi-directional valve system 300 of the of the system 10 includes an on-boarded air pressure relief valve 260 in fluid communication with one or more of the tire inflation connection line 36, the inner air communication connection line 104, and/or the outer air communication connection line 108. In the example embodiment, the on-boarded air pressure relief valve 260 is operable to limit pressure within the one or more of the tire inflation connection line 36, the inner air communication connection line 104, and/or the outer air communication connection line 108 to less than a predetermined on-boarded air pressure limit. In accordance with an example embodiment, the on-boarded air pressure relief valve 260 is operable to limit pressure delivered to the TIS 30. In accordance with an example embodiment, the on-boarded air pressure relief valve 260 is operable to limit pressure delivered to the TIS 30 to less than a predetermined on-boarded air pressure limit.

Figure 4:
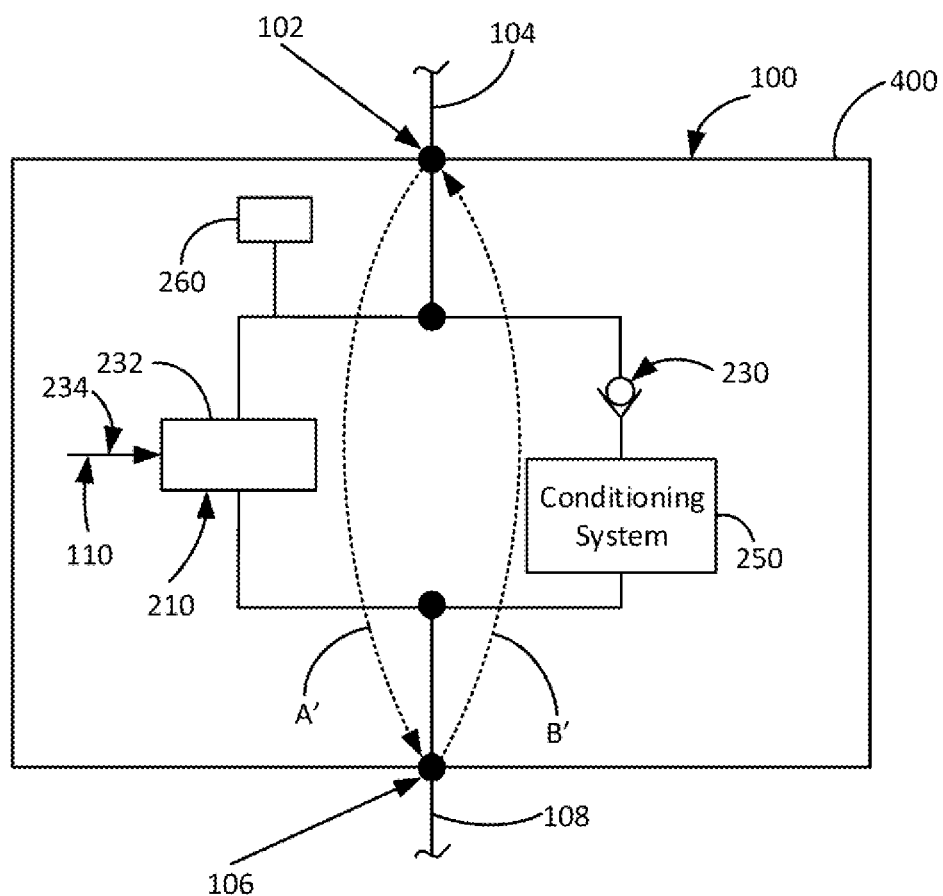
FIG. 4 is a schematic illustration showing a further example embodiment of the bi-directional valve system portion of the bi-directional air delivery system of FIGS. 1, 2 and 3.

FIG. 4 is a schematic illustration showing a further example bi-directional valve system 400 embodiment of the bi-directional valve system 100 portion of the bi-directional air delivery system 10 of FIG. 1. It is to be appreciated that the bi-directional valve system 400 of the example embodiment illustrated is fluidly coupled on a first end 102 via an inner air communication connection line 104 with a junction connection device 50 (FIG. 1), and is further fluidly coupled on a second end 106 via an outer air communication connection line 108 with the auxiliary air communication port connection device 40 (FIG. 1). With particular reference to FIG. 4, the selector valve device 210 of the bi-directional valve system 400 of the embodiment comprises an electric selector valve device 232 operable in response to a bi-directional valve system control signal 110 in the form of a position of an electric control signal 234 to transition the electric selector valve device 232 between the first and second configurations. In the example embodiment illustrated, the electric selector valve device 232 is responsive to the electric control signal 234 to transition between a first configuration closing a flow between the inner air communication connection line 104 and the outer air communication connection line 108 and a second configuration opening the flow between the inner air communication connection line 104 and the outer air communication connection line 108 to permit the local compressed air supply 24 to be delivered via the auxiliary air communication port connection device 40 to an associated compressed air consuming apparatus A (FIG. 1) as the extra-vehicular off-boarding air supply A'.

Further in the example embodiment illustrated, the check valve 230 of the bi-directional valve system 400 permits a unidirectional on-boarding air flow from the outer air communication connection line 108 to the inner air communication connection line 104 for delivery of the extra-vehicular on-boarding air supply B' from an associated compressed air producing apparatus B (FIG. 1) to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Further in the example embodiment illustrated in FIG. 4, the bi-directional valve system 400 of the of the system 10 includes an air conditioning system 250 operable to condition the extra-vehicular on-boarding air supply B' flowing through one or more of the tire inflation connection line 36, the inner air communication connection line 104, and/or the outer air communication connection line 108. The air conditioning system 250 may condition the extra-vehicular on-boarding air supply B' for example by filtering the extra-vehicular on-boarding air supply B' to impede ingress of an undesirable material into the tire inflation system 30. Such undesirable materials may include for example moisture and/or other contaminants. The air conditioning system 250 may further condition the extra-vehicular on-boarding air supply B' for example by adding a supplemental material into the extra-vehicular on-boarding air supply B'. Such supplemental materials may include for example and/or sealants that may be useful to maintaining pressure within the tires of the associated work vehicle, and/or lubricants, solvents, cleaners or the like that may be useful in helping to maintain the TIS 30. The air conditioning system 250 may condition the extra-vehicular on-boarding air supply B' for example by both filtering the extra-vehicular on-boarding air supply B' to impede the ingress of one or more undesirable materials into the tire inflation system 30, and adding a supplemental material into the extra-vehicular on-boarding air supply B'. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Yet still further in the example embodiment illustrated in FIG. 4, the bi-directional valve system 400 of the of the system 10 includes an on-boarded air pressure relief valve 260 in fluid communication with one or more of the tire inflation connection line 36, the inner air communication connection line 104, and/or the outer air communication connection line 108. In the example embodiment, the on-boarded air pressure relief valve 260 is operable to limit pressure within the one or more of the tire inflation connection line 36, the inner air communication connection line 104, and/or the outer air communication connection line 108 to less than a predetermined on-boarded air pressure limit.

Figure 5:
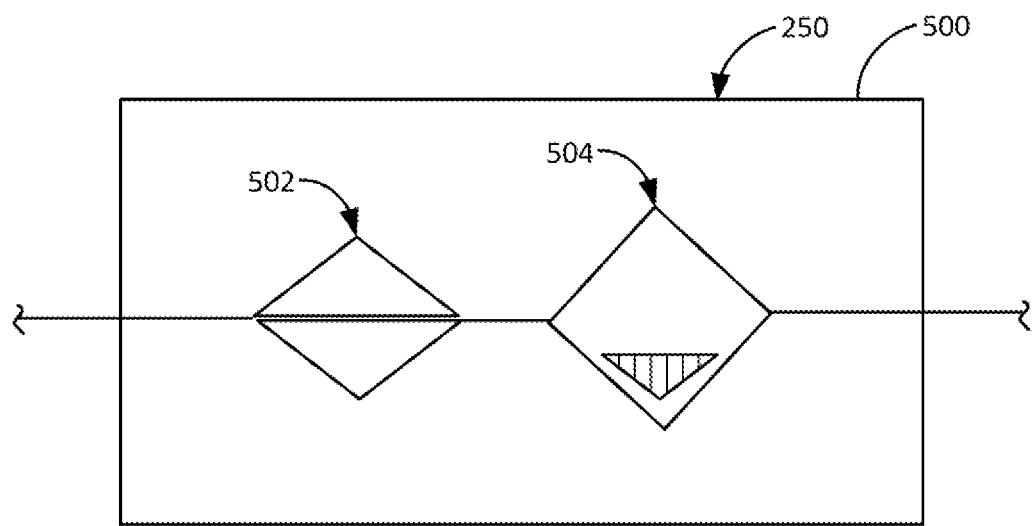
FIG. 5 is a schematic illustration showing a particular example embodiment of an air conditioning system that may be used in the system of the above Figures and operable to remove moisture from the on-boarding air flow.

FIG. 5 shows a particular example embodiment of an air conditioning system 250 operable to condition the extra-vehicular on-boarding air supply B' flowing through one or more of the tire inflation connection line 36, the inner air communication connection line 104, and/or the outer air communication connection line 108. In the example shown, the air conditioning system 250 comprises an air dryer 500 operable to remove moisture from the extra-vehicular on-boarding air supply B' flowing through one or more of the tire inflation connection line 36, the inner air communication connection line 104, and/or the outer air communication connection line 108. The air dryer 500 as shown includes a liquid separator device 502, and a coalescing filter device 504. As shown, the liquid separator device 502 and the coalescing filter device 504 are arranged serially along the path of the on-boarding air flow for removing moisture therefrom for assisting in maintaining a dry atmosphere in the system 10 and in particular in the TIS 30. It is to be appreciated however that arrangements and configurations other than the series arrangement as shown may be used as necessary or desired to help remove moisture from the on-boarding air supply B' in order to help with assisting in maintaining a dry atmosphere in the system 10 and in particular in the TIS 30. In addition, it is to be appreciated that the air dryer 500 of the particular example embodiment may include one or more of the liquid separator device 502 and/or the coalescing filter device 504.

Figure 6:
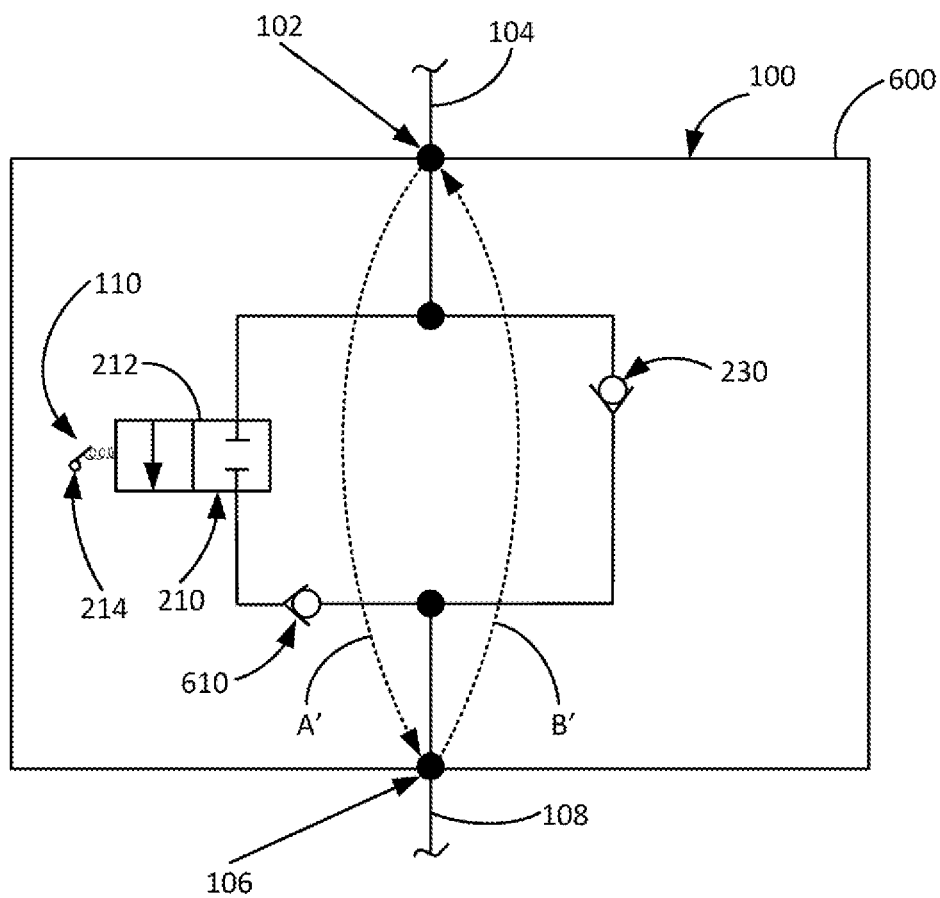
FIG. 6 is a schematic illustration showing a further example embodiment of the bi-directional valve system portion of the bi-directional air delivery system of the above Figures.

FIG. 6 is a schematic illustration showing a further example bi-directional valve system 600 embodiment of the bi-directional valve system 100 portion of the bi-directional air delivery system 10 of FIG. 1. It is to be appreciated that the bi-directional valve system 600 of the example embodiment illustrated is fluidly coupled on a first end 102 via an inner air communication connection line 104 with a junction connection device 50 (FIG. 1), and is further fluidly coupled on a second end 106 via an outer air communication connection line 108 with the auxiliary air communication port connection device 40 (FIG. 1). With particular reference to FIG. 6, the selector valve device 210 of the bi-directional valve system 600 of the embodiment comprises a manual selector valve device 212 operable in response to a bi-directional valve system control signal 110 in the form of a position of a manual actuator device 214 to transition the manual selector valve device 212 between the first and second configurations. In the example embodiment illustrated, the manual selector valve device 212 is responsive to the position of the manual actuator device 214 to transition between a first configuration closing a flow between the inner air communication connection line 104 and the outer air communication connection line 108 and a second configuration opening the flow between the inner air communication connection line 104 and the outer air communication connection line 108 to permit the local compressed air supply 24 to be delivered via the auxiliary air communication port connection device 40 to an associated compressed air consuming apparatus A (FIG. 1) as the extra-vehicular off-boarding air supply A'.

With further particular reference to FIG. 6, the bi-directional valve system 600 of the example embodiment includes a backflow prevention check valve 610 operable to prevent compressed air to flow from the second end 106 via the outer air communication connection line 108 and in a reverse direction through the manual selector valve device 212 such as when the manual actuator device 214 of the manual selector valve device 212 is inadvertently left in an open position permitting compressed air flow therethrough. In a further embodiment, the manual selector valve device 212 may be provide with an internal backflow preventing check valve to perform the same or similar function.

Further in the example embodiment illustrated, the check valve 230 of the bi-directional valve system 600 permits a unidirectional on-boarding air flow from the outer air communication connection line 108 to the inner air communication connection line 104 for delivery of the extra-vehicular on-boarding air supply B' from an associated compressed air producing apparatus B (FIG. 1) to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

Figure 7:
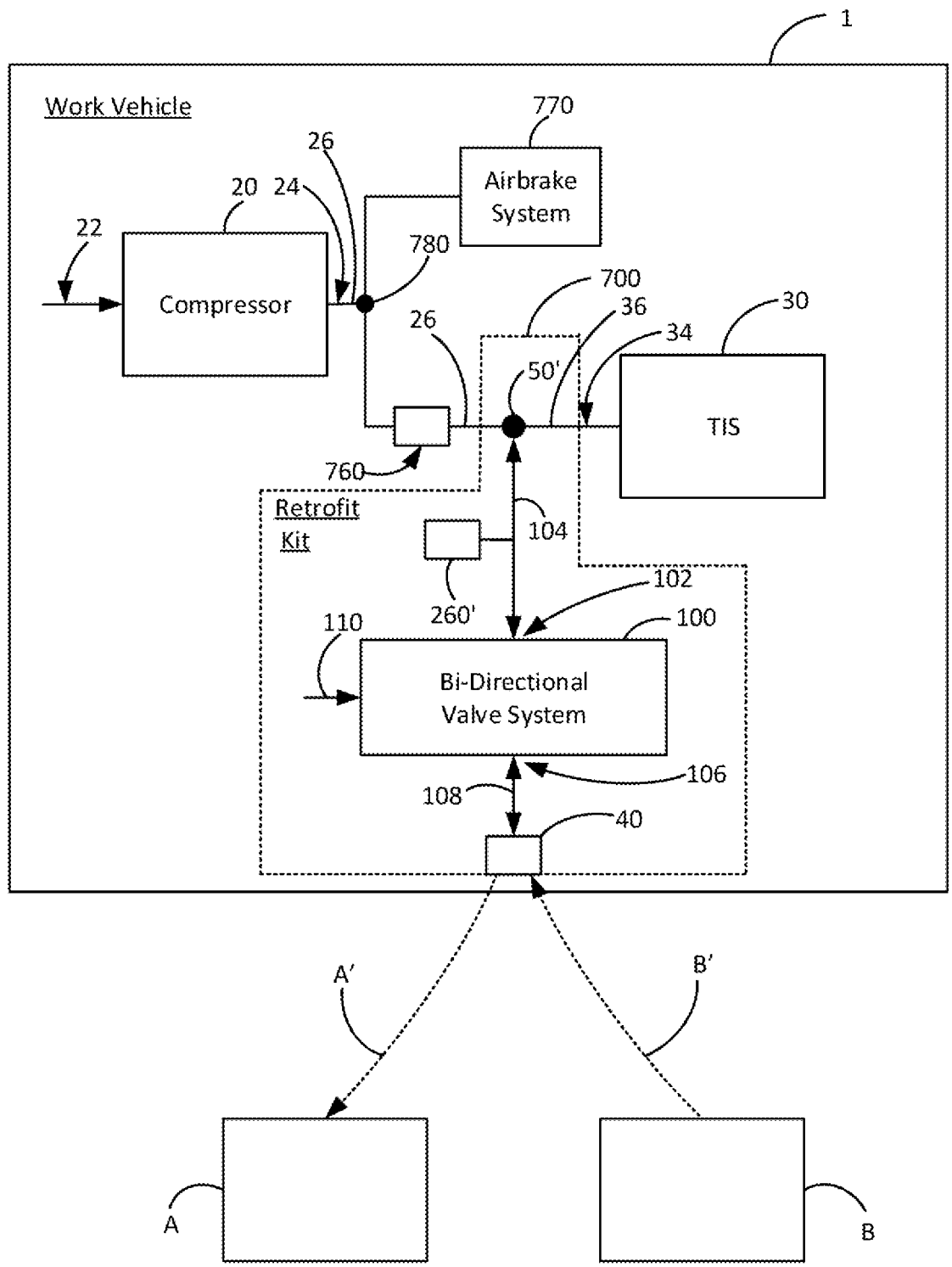
FIG. 7 is a schematic illustration showing a bi-directional air delivery retrofit kit for providing on-boarding and off-boarding of an extra-vehicular compressed air product relative to an associated work vehicle in accordance with an example embodiment.

FIG. 7 is a schematic illustration showing a bi-directional air delivery retrofit kit 700 for providing on-boarding and off-boarding of an extra-vehicular compressed air product A', B' relative to an associated work vehicle 1 in accordance with an example embodiment. With reference now to that Figure together with reference to FIGS. 2-6, the bi-directional air delivery retrofit kit 700 of the example embodiment is configured to provide the extra-vehicular compressed air product A', B' relative to an associated work vehicle 1 of the type including a work vehicle compressor 20 configured to compress a first supply of air 22 and to output a local compressed air supply 24 via an on-board compressed air source connection line 26, and a tire inflation system 30 configured to regulate an air pressure within one or more tires of the associated work vehicle 1 by selectively increasing and decreasing the air pressure within the one or more tires of the associated work vehicle 1 and to distribute to the one or more tires of the associated work vehicle 1 a tire inflation input air supply 34 received by the tire inflation system 30 via a tire inflation connection line 36. Overall, the retrofit kit 700 includes a junction connection device 50' configured to be selectively coupled with an on-board compressed air source connection line 26 of the associated work vehicle 1, and also with a tire inflation connection line 36 of the associated work vehicle 1. The retrofit kit 700 also includes an auxiliary air communication port connection device 40 configured to be mounted on the associated work vehicle 1, and a bi-directional valve system 100 fluidly coupled on a first end 102 via an inner air communication connection line 104 with the junction connection device 50', and fluidly coupled on a second end 106 via an outer air communication connection line 108 with the auxiliary air communication port connection device 40.

The auxiliary air communication port connection device 40 of the bi-directional air delivery retrofit kit 700 of the example embodiment is configured to selectively couple the retrofit kit 700 with one or more associated compressed air processing apparatus A, B for communicating an extra-vehicular compressed air product A', B' between the retrofit kit 700 and the one or more associated compressed air processing apparatus A, B.

The bi-directional valve system 100 of the bi-directional air delivery retrofit kit 700 of the example embodiment is operable to selectively fluid couple the inner air communication connection line 104 with the outer air communication connection line 108 responsive to a bi-directional valve system control signal 110 to permit the local compressed air supply 24 to be delivered via the auxiliary air communication port connection device 40 to the associated compressed air processing apparatus A as an extra-vehicular off-boarding air supply A'. The bi-directional valve system 100 of the bi-directional air delivery retrofit kit 700 of the example embodiment is further operable to selectively fluid couple the outer air communication connection line 108 with the inner air communication connection line 104 responsive to the auxiliary air communication port connection device 40 being supplied an extra-vehicular on-boarding air supply B' from the associated compressed air processing apparatus B for delivery to the tire inflation system 30.

The bi-directional valve system 100 of the bi-directional retrofit kit of the example embodiment is similar to the embodiments described above and may include one or more of any of the bi-directional valve systems 220, 300, 400, 600 described above, and further may include any one or more of the subcomponents of any of the bi-directional valve systems 220, 300, 400, 600 described above.

The bi-directional valve system 100 of the bi-directional air delivery retrofit kit 700 of the example embodiment is responsive to the bi-directional valve system control signal 110 to transition between a first configuration closing a flow between the inner air communication connection line 104 and the outer air communication connection line 108 and a second configuration opening the flow between the inner air communication connection line 104 and the outer air communication connection line 108 to permit the local compressed air supply 24 to be delivered via the auxiliary air communication port connection device 40 to an associated compressed air consuming apparatus A as the extra-vehicular off-boarding air supply A'. A check valve 230 (FIGS. 2, 3, 4, 6) may permit a unidirectional on-boarding air flow from the outer air communication connection line 108 to the inner air communication connection line 104 for delivery of the extra-vehicular on-boarding air supply B' from an associated compressed air producing apparatus B to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

In one form and as described above in connection with other example embodiments, the bi-directional valve system 100 of the bi-directional air delivery retrofit kit 700 of the example embodiment includes a manual selector valve device 212 (FIG. 3) operable in response to a position of a manual actuator device 214 (FIG. 3) to transition the manual selector valve device 212 between the first and second configurations.

In another form and as described above in connection with other example embodiments, the bi-directional valve system 100 of the bi-directional air delivery retrofit kit 700 of the example embodiment includes an electric selector valve device 232 (FIG. 4) operable in response to an electric control signal 234 (FIG. 4) to transition the electric selector valve device 232 between the first and second configurations.

The bi-directional valve system 100 of the bi-directional retrofit kit of the example embodiment is similar to the embodiments described above and includes an air conditioning system 250 (FIGS. 3-5) operable to operable to condition the extra-vehicular on-boarding air supply B' flowing through one or more of the tire inflation connection line 36, the inner air communication connection line 104, and/or the outer air communication connection line 108. The air conditioning system 250 may condition the extra-vehicular on-boarding air supply B' for example by filtering the extra-vehicular on-boarding air supply B' to impede ingress of one or more undesirable materials into the tire inflation system 30. Such undesirable materials may include for example moisture and/or other contaminants. The air conditioning system 250 may further condition the extra-vehicular on-boarding air supply B' for example by adding a supplemental material into the extra-vehicular on-boarding air supply B'. Such supplemental materials may include for example sealants that may be useful to help to maintaining pressure within the tires of the associated work vehicle and/or to help maintain the integrity of joints, seals or the like of the TIS 30. Such supplemental materials may further include for example lubricants, solvents, cleaners or the like that may be useful in helping to maintain the TIS 30 and/or the tires of the work vehicle. In further example embodiments the air conditioning system 250 may condition the extra-vehicular on-boarding air supply B' for example by both filtering the extra-vehicular on-boarding air supply B' to impede the ingress of one or more undesirable materials into the tire inflation system 30, and adding a supplemental material into the extra-vehicular on-boarding air supply B'.

In accordance with a further example embodiment, the air conditioning system included in the bi-directional air delivery retrofit kit 700 for providing on-boarding and off-boarding of an extra-vehicular compressed air product A', B' relative to the associated work vehicle 1 includes an air dryer 500 (FIG. 5) operable to remove moisture from the extra-vehicular on-boarding air supply B' flowing through one or more of the tire inflation connection line 36, the inner air communication connection line 104, and/or the outer air communication connection line 108. The air dryer may include a liquid separator device 502 (FIG. 5) and a coalescing filter device 504 (FIG. 5), wherein the liquid separator device and the coalescing filter device are arranged serially along the path of the on-boarding air flow for removing moisture therefrom for assisting in maintaining a dry atmosphere in the system 10 and in particular in the TIS 30. It is to be appreciated however that arrangements and configurations other than the series arrangement as shown may be used as necessary or desired to help remove moisture from the on-boarding air supply B' in order to help with assisting in maintaining a dry atmosphere in the system 10 and in particular in the TIS 30. In addition, it is to be appreciated that the air dryer of the particular example embodiment may include one or more of the liquid separator device 502 and/or the coalescing filter device 504 or any other device or devices for conditioning the on-boarding air supply B' such as for example to remove moisture or the like.

In addition, the bi-directional valve system 100 of the bi-directional air delivery retrofit kit 700 of the example embodiment is similar to the embodiments described above and may include an on-boarded air pressure relief valve 260' (FIGS. 3, 4) in fluid communication with one or more of the tire inflation connection line 36, the inner air communication connection line 104, and/or the outer air communication connection line 108. In the example embodiment, the on-boarded air pressure relief valve 260' is operable to limit pressure within the one or more of the tire inflation connection line 36, the inner air communication connection line 104, and/or the outer air communication connection line 108 to less than a predetermined on-boarded air pressure limit. In accordance with an example embodiment, the predetermined on-boarded air pressure limit is about 9 bar. In that way, the on-boarded air pressure relief valve 260' operates to limit pressure within the one or more of the tire inflation connection line 36, the inner air communication connection line 104, and/or the outer air communication connection line 108 to less than an on-boarded air pressure limit of about 9 bar.

In the application of the bi-directional valve system 100 of the bi-directional air delivery retrofit kit 700 of the example embodiment, a work vehicle air trailer brake system 770 of the associated work vehicle 1 is fluidly coupled with the on-board compressed air source connection line 26 at a connection node 780 between the work vehicle compressor 20 and a charging valve device 760. The charging valve device 760 is operative to prevent a flow of air from junction connection device 50 to the connection node 780. In that way, the pressure within the TIS 30 is not shared with the work vehicle air trailer brake system 770 such as by the pressure within the TIS 30 being bled off to the work vehicle air trailer brake system 770. In addition, the charging valve device 760 is operative to direct all of the compressed air received from the compressor 20 to the work vehicle air trailer brake system 770 until a predetermined pressure is built up in the work vehicle air trailer brake system 770. In the example embodiment, the predetermined pressure is set to about 7 bar. In that way, delivery of the compressed air from the compressor 20 is prioritized to the work vehicle air trailer brake system 770. After the pressure at the work vehicle air trailer brake system 770 reaches the predetermined pressure such as about 7 bar for example as determined by the charging valve device 760 by sensing the pressure at the connection node 780, air may be delivered to the TIS 30. As shown, the fluid coupling of the work vehicle air trailer brake system 770 with the on-board compressed air source connection line 26 in this position at the connection node 780 between the work vehicle compressor 20 and the charging valve device 760 ensures a priority of delivery of the local compressed air supply 24 generated by the work vehicle compressor 20 to the work vehicle air trailer brake system 770 above delivery to the tire inflation system 30 for distribution to tires of the associated work vehicle.

It is to be appreciated that the work vehicle air brake system 770 and the charging valve device 760 shown in the Figure form no part of the subject bi-directional air delivery retrofit kit 700, but rather is part of the associated work vehicle and is illustrated to show an environment in which the bi-directional air delivery retrofit kit 700 may operate.

In accordance with a further embodiment an on-boarding only air delivery retrofit kit may be provided for providing on-boarding only of an extra-vehicular compressed air product relative to an associated work vehicle. The on-boarding only uni-directional air delivery retrofit kit of the example embodiment is configured to provide the extra-vehicular compressed air product B' relative to an associated work vehicle 1 of the type including a work vehicle compressor 20 configured to compress a first supply of air 22 and to output a local compressed air supply 24 via an on-board compressed air source connection line 26, and a tire inflation system 30 configured to regulate an air pressure within one or more tires of the associated work vehicle 1 by selectively increasing and decreasing the air pressure within the one or more tires of the associated work vehicle 1 and to distribute to the one or more tires of the associated work vehicle 1 a tire inflation input air supply 34 received by the tire inflation system 30 via a tire inflation connection line 36. Overall, the on-boarding only retrofit kit includes a junction connection device 50' configured to be selectively coupled with an on-board compressed air source connection line 26 of the associated work vehicle 1, and also with a tire inflation connection line 36 of the associated work vehicle 1. The on-boarding only retrofit kit also includes an auxiliary air communication port connection device 40 configured to be mounted on the associated work vehicle 1, and only the on-boarding portion of the bi-directional valve system 100 described above fluidly coupled on a first end 102 via an inner air communication connection line 104 with the junction connection device 50', and fluidly coupled on a second end 106 via an outer air communication connection line 108 with the auxiliary air communication port connection device 40.

The auxiliary air communication port connection device 40 of the on-boarding only uni-directional air delivery retrofit kit of the example embodiment is configured to selectively couple the on-boarding only retrofit kit with one or more associated compressed air processing apparatus B for communicating an extra-vehicular compressed air product B' into the associated work vehicle.

The on-boarding only uni-directional air delivery retrofit kit of the example embodiment is similar to the embodiments described above and may include one or more of the on-boarding portions of any of the bi-directional valve systems 220, 300, 400, 600 described above, and further may include any one or more of the on-boarding subcomponents of any of the bi-directional valve systems 220, 300, 400, 600 described above. In particular, the on-boarding only uni-directional air delivery retrofit kit of the example embodiment includes an on-boarded air pressure relief valve 260' (FIGS. 3, 4) in fluid communication with one or more of the tire inflation connection line 36, the inner air communication connection line 104, and/or the outer air communication connection line 108. In the example embodiment, the on-boarded air pressure relief valve 260' is operable to limit pressure within the one or more of the tire inflation connection line 36, the inner air communication connection line 104, and/or the outer air communication connection line 108 to less than a predetermined on-boarded air pressure limit. In accordance with an example embodiment, the predetermined on-boarded air pressure limit is about 9 bar. In that way, the on-boarded air pressure relief valve 260' operates to limit pressure within the one or more of the tire inflation connection line 36, the inner air communication connection line 104, and/or the outer air communication connection line 108 to less than an on-boarded air pressure limit of about 9 bar.

The on-boarding only uni-directional air delivery retrofit kit of the example embodiment is responsive to the bi-directional valve system control signal 110 to transition between a first configuration closing a flow between the inner air communication connection line 104 and the outer air communication connection line 108 and a second configuration opening the flow between the inner air communication connection line 104 and the outer air communication connection line 108 to on-boarding of compressed air such as for example to quickly fill the tires of the work vehicle.

A check valve 230 (FIGS. 2, 3, 4, 6) may permit the unidirectional on-boarding air flow from the outer air communication connection line 108 to the inner air communication connection line 104 for delivery of the extra-vehicular on-boarding air supply B' from an associated compressed air producing apparatus B to the tire inflation system 30. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

In another form and as described above in connection with other example embodiments, the bi-directional valve system 100 of the on-boarding only uni-directional air delivery retrofit kit of the example embodiment includes an electric selector valve device 232 (FIG. 4) operable in response to an electric control signal 234 (FIG. 4) to transition the electric selector valve device 232 between the first and second configurations.

The on-boarding only uni-directional air delivery retrofit kit of the example embodiment is similar to the embodiments described above and includes an air conditioning system 250 (FIGS. 3-5) operable to operable to condition the extra-vehicular on-boarding air supply B' flowing through one or more of the tire inflation connection line 36, the inner air communication connection line 104, and/or the outer air communication connection line 108. The air conditioning system 250 may condition the extra-vehicular on-boarding air supply B' for example by filtering the extra-vehicular on-boarding air supply B' to impede ingress of one or more undesirable materials into the tire inflation system 30. Such undesirable materials may include for example moisture and/or other contaminants. The air conditioning system 250 may further condition the extra-vehicular on-boarding air supply B' for example by adding a supplemental material into the extra-vehicular on-boarding air supply B'. Such supplemental materials may include for example sealants that may be useful to help to maintaining pressure within the tires of the associated work vehicle and/or to help maintain the integrity of joints, seals or the like of the TIS 30. Such supplemental materials may further include for example lubricants, solvents, cleaners or the like that may be useful in helping to maintain the TIS 30 and/or the tires of the work vehicle. In further example embodiments the air conditioning system 250 may condition the extra-vehicular on-boarding air supply B' for example by both filtering the extra-vehicular on-boarding air supply B' to impede the ingress of one or more undesirable materials into the tire inflation system 30, and adding a supplemental material into the extra-vehicular on-boarding air supply B'.

In accordance with a further example embodiment, the air conditioning system included in the on-boarding only uni-directional air delivery retrofit kit for providing on-boarding and off-boarding of an extra-vehicular compressed air product A', B' relative to the associated work vehicle 1 includes an air dryer 500 (FIG. 5) operable to remove moisture from the extra-vehicular on-boarding air supply B' flowing through one or more of the tire inflation connection line 36, the inner air communication connection line 104, and/or the outer air communication connection line 108. The air dryer may include a liquid separator device 502 (FIG. 5) and a coalescing filter device 504 (FIG. 5), wherein the liquid separator device and the coalescing filter device are arranged serially along the path of the on-boarding air flow for removing moisture therefrom for assisting in maintaining a dry atmosphere in the system 10 and in particular in the TIS 30. It is to be appreciated however that arrangements and configurations other than the series arrangement as shown may be used as necessary or desired to help remove moisture from the on-boarding air supply B' in order to help with assisting in maintaining a dry atmosphere in the system 10 and in particular in the TIS 30. In addition, it is to be appreciated that the air dryer of the particular example embodiment may include one or more of the liquid separator device 502 and/or the coalescing filter device 504 or any other device or devices for conditioning the on-boarding air supply B' such as for example to remove moisture or the like.

In the application of the bi-directional valve system 100 of the on-boarding only uni-directional air delivery retrofit kit of the example embodiment, a work vehicle air trailer brake system 770 of the associated work vehicle 1 is fluidly coupled with the on-board compressed air source connection line 26 at a connection node 780 between the work vehicle compressor 20 and a charging valve device 760. The charging valve device 760 is operative to prevent a flow of air from junction connection device 50 to the connection node 780. In that way, the pressure within the TIS 30 is not shared with the work vehicle air trailer brake system 770 such as by the pressure within the TIS 30 being bled off to the work vehicle air trailer brake system 770. In addition, the charging valve device 760 is operative to direct all of the compressed air received from the compressor 20 to the work vehicle air trailer brake system 770 until a predetermined pressure is built up in the work vehicle air trailer brake system 770. In the example embodiment, the predetermined pressure is set to about 7 bar. In that way, delivery of the compressed air from the compressor 20 is prioritized to the work vehicle air trailer brake system 770. After the pressure at the work vehicle air trailer brake system 770 reaches the predetermined pressure such as about 7 bar for example as determined by the charging valve device 760 by sensing the pressure at the connection node 780, air may be delivered to the TIS 30. As shown, the fluid coupling of the work vehicle air trailer brake system 770 with the on-board compressed air source connection line 26 in this position at the connection node 780 between the work vehicle compressor 20 and the charging valve device 760 ensures a priority of delivery of the local compressed air supply 24 generated by the work vehicle compressor 20 to the work vehicle air trailer brake system 770 above delivery to the tire inflation system 30 for distribution to tires of the associated work vehicle.

It is to be appreciated that the work vehicle air brake system 770 and the charging valve device 760 shown in the Figure form no part of the subject on-boarding only uni-directional air delivery retrofit kit, but rather is part of the associated work vehicle and is illustrated to show an environment in which the on-boarding only uni-directional air delivery retrofit kit may operate.

Figure 8:
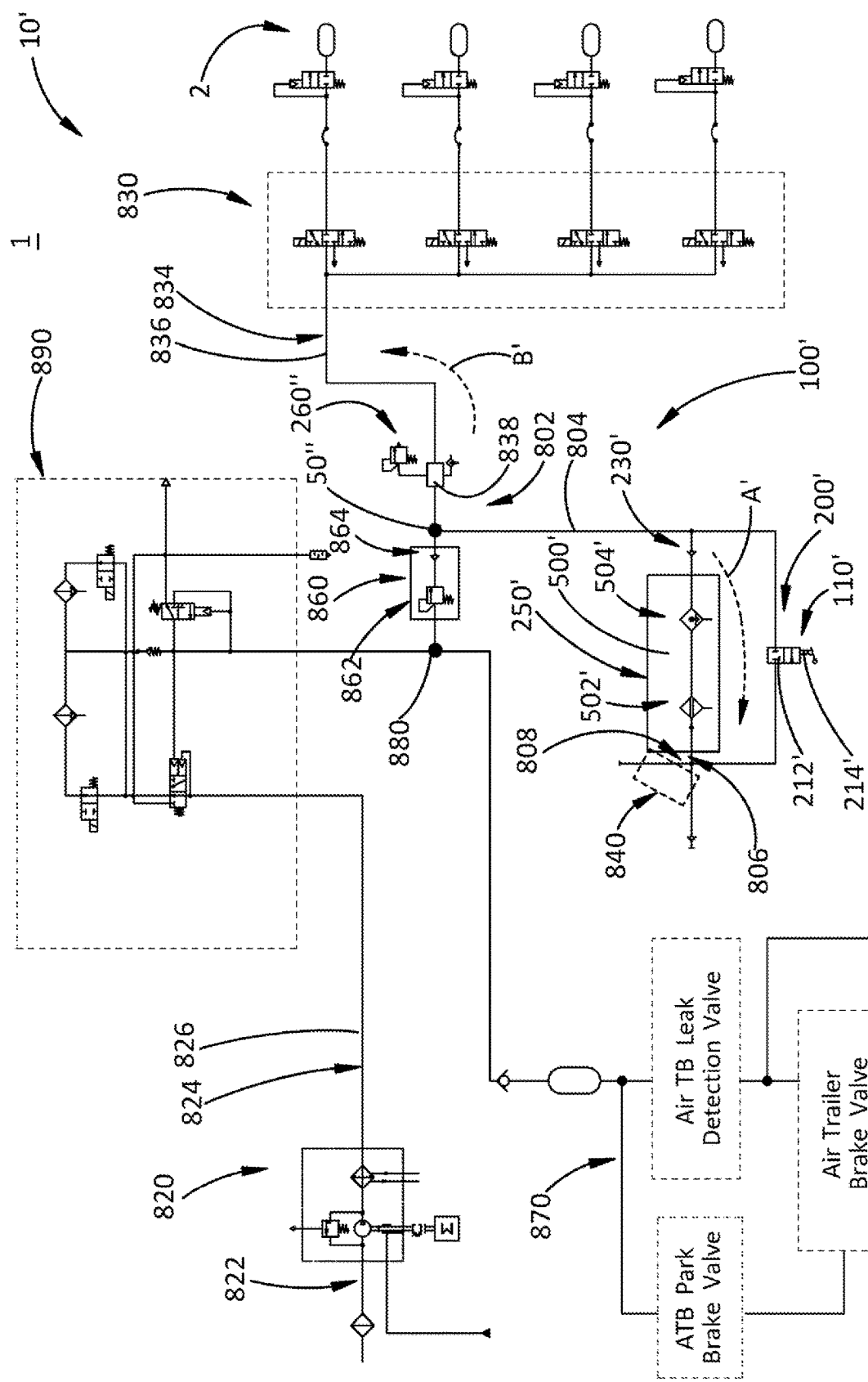
FIG. 8 is a schematic illustration showing a bi-directional air delivery system in accordance with a further example embodiment.

FIG. 8 is a schematic illustration showing a bi-directional air delivery system 10' in accordance with a further example embodiment. With reference now to that Figure and as shown there, the bi-directional air delivery system 10' includes a work vehicle compressor 820, a tire inflation system 830, an auxiliary air communication port connection device 840, and a bi-directional valve system 100'. The work vehicle compressor 820 is configured to generate a local compressed air supply 824, the tire inflation system 830 is configured to receive a tire inflation input air supply 834 for distribution to tires 2 of an associated work vehicle, and the auxiliary air communication port connection device 840 is configured to provide a fluid coupling to the bi-directional air delivery system 10'. The bi-directional valve system 100' is configured to communicate an extra-vehicular off-boarding air supply A' from the local compressed air supply 824 to the auxiliary air communication port connection device 840, and also to communicate an extra-vehicular on-boarding air supply B' from the auxiliary air communication port connection device 840 to the tire inflation input air supply 834.

In accordance with the example embodiment shown, the work vehicle compressor 820 is configured to be mounted on an associated work vehicle and to compress a first supply of air 822 and to output the local compressed air supply 824 via an on-board compressed air source connection line 826. Further in accordance with the example embodiment, the tire inflation system 830 is also configured to be mounted on the associated work vehicle and is configured to regulate an air pressure within one or more tires 2 of the associated work vehicle by selectively increasing and decreasing the air pressure within the one or more tires 2 of the associated work vehicle. The tire inflation system 830 is configured to distribute to the one or more tires 2 of the associated work vehicle the tire inflation input air supply 834 received by the tire inflation system 830 via a tire inflation connection line 836.

Further in accordance with the example embodiment, a pressurized air storage device 838 is fluidly coupled with the tire inflation connection line 836 and is operable to store compressed air received by the pressurized air storage device 838, and to pay out the stored compressed air to the tire inflation system 830 for selective distribution to the one or more tires 2 of the associated work vehicle 1 as the tire inflation input air supply 834. In accordance with the example embodiment, the pressurized air storage device 838 is operable to store compressed air received from the work vehicle compressor 820. In accordance with the example embodiment, the pressurized air storage device 838 is further operable to store compressed air received from the auxiliary air communication port connection device 840. Still yet further the pressurized air storage device 838 is operable to store compressed air received from a combination of both the work vehicle compressor 820 and the auxiliary air communication port connection device 940.

Further in accordance with the example embodiment, the auxiliary air communication port connection device 840 is also configured to be mounted on the associated work vehicle, and is also operable to selectively couple the bi-directional air delivery system 10' with one or more associated compressed air processing apparatus (not shown) for communicating the extra-vehicular compressed air product A', B' between the bi-directional air delivery system 10' and the one or more associated compressed air processing apparatus (not shown).

The bi-directional valve system 100' of the example embodiment illustrated is fluidly coupled on a first end 802 via an inner air communication connection line 804 with the on-board compressed air source connection line 826 and with the tire inflation connection line 836. The bi-directional valve system 100' of the example embodiment illustrated is fluidly coupled on the first end 802 with the on-board compressed air source connection line 826 via a charging valve device 860 and an on-board air conditioning device 890. The bi-directional valve system 100' is fluidly coupled with the tire inflation connection line 836 via an on-boarded air pressure relief valve 260" to be described below. The bi-directional valve system 100' is fluidly coupled on a second end 806 via an outer air communication connection line 808 with the auxiliary air communication port connection device 840.

The bi-directional valve system 100' of the example embodiment is operable in a first mode of operation to selectively fluid couple the inner air communication connection line 804 with the outer air communication connection line 808 responsive to a bi-directional valve system control signal 110' to permit the local compressed air supply 824 to be delivered via the auxiliary air communication port connection device 840 to the associated compressed air processing apparatus (not shown) as the extra-vehicular off-boarding air supply A'. Accordingly, a desirable technical effect of the bi-directional air delivery system 100' of the example embodiment is that it provides off-boarding of compressed air from an on-board compressor of a TIS system integrated with the work machine for delivery to an associated or external compressed air consuming device such as an implement or the like that uses pneumatics.

The bi-directional valve system 100' of the example embodiment is further operable in a second mode of operation to selectively fluid couple the inner air communication connection line 804 with the outer air communication connection line 808 responsive to the auxiliary air communication port connection device 840 being supplied the extra-vehicular on-boarding air supply B' from the associated compressed air processing apparatus (not shown) for delivery to the tire inflation system 830. Preferably, the bi-directional valve system 100' of the example embodiment is controlled or otherwise prevented from operating in both of the first and second modes of operation simultaneously. Accordingly, a desirable technical effect of the bi-directional air delivery system of the example embodiment is that it provides on-boarding of compressed air from an associated or auxiliary source such as for example an external large compressor or air storage tank for assisting a TIS system integrated with the work machine to expedite tire inflation particularly when transitioning to a desired raised tire pressure. In an example embodiment, the on-boarding of the pressurized air may occur at a rate of about 4,000 L/min. at a pressure of about 4 bar for example whereby tires of a work vehicle may be quickly and efficiently inflated to a desired raised pressure thereby saving time and costs.

In the example embodiment the bi-directional valve system 100' comprises a selector valve device 200' and a check valve 230'. In the example embodiment illustrated, the selector valve device 200' is responsive to the bi-directional valve system control signal 110' to transition between a first configuration closing a flow between the inner air communication connection line 804 and the outer air communication connection line 808 and a second configuration opening the flow between the inner air communication connection line 804 and the outer air communication connection line 808 to permit the local compressed air supply 824 to be delivered via the auxiliary air communication port connection device 840 to an associated compressed air consuming apparatus A (not shown) as the extra-vehicular off-boarding air supply A'.

Further in the example embodiment illustrated, the check valve 230' of the bi-directional valve system 100' permits a unidirectional on-boarding air flow from the outer air communication connection line 808 to the inner air communication connection line 804 for delivery of the extra-vehicular on-boarding air supply B' from an associated compressed air producing apparatus B (not shown) to the tire inflation system 830.

The selector valve device 200' of the bi-directional valve system 100' of the embodiment comprises a manual selector valve device 212' operable in response to a position of a manual actuator device 214' to transition the manual selector valve device 802 between the first and second configurations. In the example embodiment illustrated, the manual selector valve device 802 is responsive to the position of the manual actuator device 214' to transition between a first configuration closing a flow between the inner air communication connection line 804 and the outer air communication connection line 808 and a second configuration opening the flow between the inner air communication connection line 804 and the outer air communication connection line 808 to permit the local compressed air supply 824 to be delivered via the auxiliary air communication port connection device 840 to an associated compressed air consuming apparatus A (not shown) as the extra-vehicular off-boarding air supply A'.

Further in the example embodiment illustrated, the bi-directional valve system 100' of the of the air delivery system 10' includes an air conditioning system 250' operable to condition the extra-vehicular on-boarding air supply B' flowing through one or more of the tire inflation connection line 836, the inner air communication connection line 804, and/or the outer air communication connection line 808. The air conditioning system 250' may condition the extra-vehicular on-boarding air supply B' for example by filtering the extra-vehicular on-boarding air supply B' to impede ingress of one or more undesirable materials into the tire inflation system 830. Such undesirable materials may include for example moisture and/or other contaminants. The air conditioning system 250' may further condition the extra-vehicular on-boarding air supply B' for example by adding a supplemental material into the extra-vehicular on-boarding air supply B'. Such supplemental materials may include for example sealants that may be useful to help to maintaining pressure within the tires of the associated work vehicle and/or to help maintain the integrity of joints, seals or the like of the TIS 830. Such supplemental materials may further include for example lubricants, solvents, cleaners or the like that may be useful in helping to maintain the TIS 830 and/or the tires of the work vehicle. In further example embodiments the air conditioning system 250' may condition the extra-vehicular on-boarding air supply B' for example by both filtering the extra-vehicular on-boarding air supply B' to impede the ingress of one or more undesirable materials into the tire inflation system 30, and adding a supplemental material into the extra-vehicular on-boarding air supply B'.

In the example shown, the air conditioning system 250' comprises an air dryer 500' operable to remove moisture from the extra-vehicular on-boarding air supply B' flowing through one or more of the tire inflation connection line 836, the inner air communication connection line 804, and/or the outer air communication connection line 808. The air dryer 500' as shown includes a liquid separator device 502', and a coalescing filter device 504'. As shown, the liquid separator device 502' and the coalescing filter device 504' are arranged serially along the path of the on-boarding air flow for removing moisture therefrom for assisting in maintaining a dry atmosphere in the air delivery system 10' and in particular in the TIS 830. It is to be appreciated however that arrangements and configurations other than the series arrangement as shown may be used as necessary or desired to help remove moisture from the on-boarding air supply B' in order to help with assisting in maintaining a dry atmosphere in the air delivery system 10' and in particular in the TIS 830. In addition, it is to be appreciated that the air dryer 500' of the particular example embodiment may include one or more of the liquid separator device 502' and/or the coalescing filter device 504'.

Yet still further in the example embodiment illustrated, the bi-directional valve system 100' of the of the air delivery system 10' includes an on-boarded air pressure relief valve 260" in fluid communication with one or more of the tire inflation connection line 836, the inner air communication connection line 804, and/or the outer air communication connection line 808. In the example embodiment, the on-boarded air pressure relief valve 260" is operable to limit pressure within the one or more of the tire inflation connection line 836, the inner air communication connection line 804, and/or the outer air communication connection line 808 to less than a predetermined on-boarded air pressure limit. In accordance with an example embodiment, the predetermined on-boarded air pressure limit is about 9 bar. In that way, the on-boarded air pressure relief valve 260" operates to limit pressure within the one or more of the tire inflation connection line 836, the inner air communication connection line 804, and/or the outer air communication connection line 808 to less than an on-boarded air pressure limit of about 9 bar.

It is to be appreciated that the work vehicle air brake system 870 shown in the Figure forms no part of the subject rapid on-boarding control valve system 100' but rather is part of the associated work vehicle and is illustrated to show an environment in which the rapid on-boarding control valve system 100' may operate. In the overall environment as shown, the work vehicle air trailer brake system 870 receives pressurized air from the work vehicle compressor 820. The work vehicle air trailer brake system 870 is fluidly coupled with the on-board compressed air source connection line 826 at a connection node 880 between the work vehicle compressor 820 and a charging valve device 860. The charging valve device 860 is operative to prevent a flow of air from a junction connection device 50" to the connection node 880. In that way, the pressure within the TIS 830 is not shared with the work vehicle air trailer brake system 870 such as by the pressure within the TIS 830 being bled off to the work vehicle air trailer brake system 870. In addition, the charging valve device 860 is operative to direct all of the compressed air received from the compressor 820 to the work vehicle air trailer brake system 870 until a predetermined pressure is built up in the work vehicle air trailer brake system 870. In the example embodiment, the predetermined pressure of the charging valve device 860 is set to about 7 bar. In that way, delivery of the compressed air from the compressor 820 is prioritized to the work vehicle air trailer brake system 870 until the pressure delivered to the air trailer brake system 870 reaches the predetermined level of the charging valve device 860 such as for example about 7 bar. Pressurized air may be delivered to the TIS 830 after the pressure at the work vehicle air trailer brake system 870 reaches the predetermined pressure such as about 7 bar for example as determined by the charging valve device 860 by sensing the pressure at the connection node 880, air may be delivered to the TIS 830. As shown, the fluid coupling of the work vehicle air trailer brake system 870 with the on-board compressed air source connection line 826 in this position at the connection node 880 between the work vehicle compressor 820 and the charging valve device 860 ensures a priority of delivery of the local compressed air supply 824 generated by the work vehicle compressor 820 to the work vehicle air trailer brake system 870 above delivery to the tire inflation system 830 for distribution to tires of the associated work vehicle. In the example embodiment, the charging valve device 860 is disposed in the on-board compressed air source connection line 826 between the junction connection device 50" and the work vehicle compressor 820, and the charging valve device 860 comprises a forward pressure relief portion 862 operable to prevent a flow of air having a pressure less than a predetermined pressure level such as for example about 7 bar through the charging valve device 860 towards the tire inflation junction connection device 50", and a reverse flow check valve portion 864 operable to prevent a flow of air through the charging valve device 860 towards the work vehicle compressor 820.

It is to be appreciated that the selector valve device 200' of the bi-directional valve system 100' of the embodiment may equivalently comprise an electric selector valve device (not shown) operable in response to an electric control signal functioning as the bi-directional valve system control signal 110' to transition the electric selector valve device between the first and second configurations. In the example embodiment illustrated. The electric selector valve device may be responsive to the electric control signal to transition between a first configuration closing a flow between the inner air communication connection line 804 and the outer air communication connection line 808 and a second configuration opening the flow between the inner air communication connection line 804 and the outer air communication connection line 808 to permit the local compressed air supply 824 to be delivered via the auxiliary air communication port connection device 840 to an associated compressed air consuming apparatus A (not shown) as the extra-vehicular off-boarding air supply A'.

The bi-directional valve system 100' of the example embodiment may further include a backflow prevention check valve (not shown) operable to prevent compressed air to flow from the second end 806 via the outer air communication connection line and in a reverse direction through the manual selector valve device 802 such as when the manual actuator device 804 of the manual selector valve device 802 is inadvertently left in an open position permitting compressed air flow therethrough. In a further embodiment, the manual selector valve device 802 may be provide with an internal backflow preventing check valve to perform the same or similar function.

Figure 9:
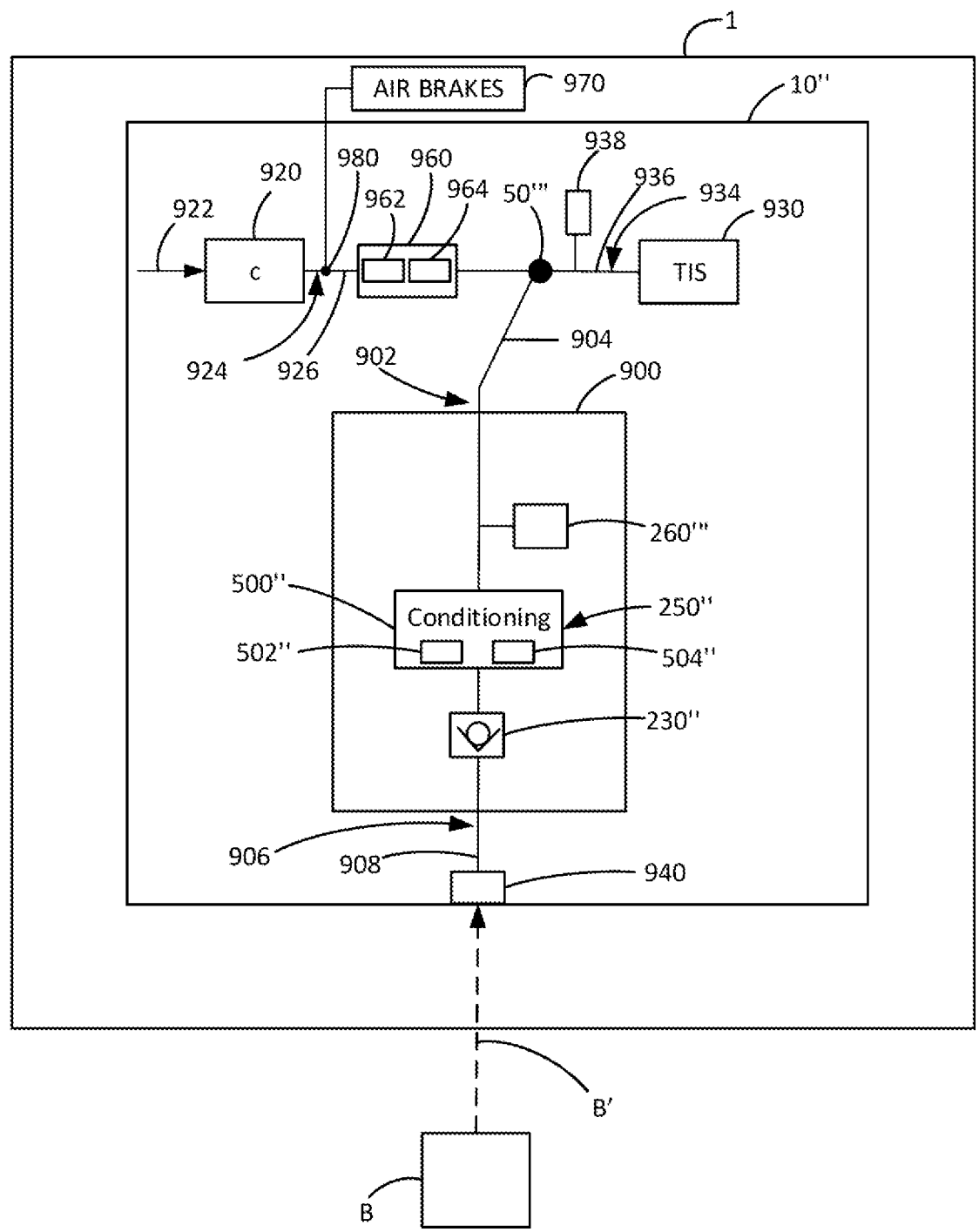
FIG. 9 is a schematic illustration showing a bi-directional air delivery system in accordance with a further example embodiment.

FIG. 9 is a schematic illustration showing a dual source air delivery system 10" for use with an associated work vehicle in accordance with a further example embodiment. The dual source air delivery system 10" of the example embodiment includes a work vehicle compressor 920, a tire inflation system 930, an auxiliary air communication port connection device 940, a pressurized air storage device 938, a fluid junction 50''', and a rapid on-boarding control valve system 900.

In accordance with the example embodiment illustrated the work vehicle compressor 920 of the example dual source air delivery system 10" is configured to be mounted on the associated work vehicle 1 and to compress a first supply of air 922 and to output a local compressed air supply 924 via an on-board compressed air source connection line 926.

Further in accordance with the example embodiment illustrated the tire inflation system 930 of the example dual source air delivery system 10" is configured to be mounted on the associated work vehicle 1 and to regulate an air pressure within one or more tires of the associated work vehicle 1 by selectively increasing and decreasing the air pressure within the one or more tires of the associated work vehicle 1, wherein the tire inflation system 930 is configured to distribute to the one or more tires of the associated work vehicle 1 a tire inflation input air supply 934 received by the tire inflation system 930 via a tire inflation connection line 936.

The auxiliary air communication port connection device 940 of the dual source air delivery system 10" in accordance with the example embodiment illustrated is configured to be mounted on the associated work vehicle 1 and to selectively couple the dual source air delivery system 10" with an associated compressed air producing apparatus B for communicating an extra-vehicular compressed air product B' from the associated compressed air producing apparatus B to the dual source air delivery system 10".

The pressurized air storage device 938 is fluidly coupled with the tire inflation connection line 936 and is operable to store compressed air received by the pressurized air storage device 938, and to pay out the stored compressed air to the tire inflation system 930 for selective distribution to the one or more tires of the associated work vehicle 1 as the tire inflation input air supply 934. In accordance with the example embodiment, the pressurized air storage device 938 is operable to store compressed air received from the work vehicle compressor 920. In accordance with the example embodiment, the pressurized air storage device 938 is further operable to store compressed air received from the auxiliary air communication port connection device 940. Still yet further the pressurized air storage device 938 is operable to store compressed air received from a combination of both the work vehicle compressor 920 and the auxiliary air communication port connection device 940.

As shown, the fluid junction 50''' is operatively fluidly coupled with the on-board compressed air source connection line 926 and with the tire inflation connection line 936. In addition, the rapid on-boarding control valve system 900 is fluidly coupled on a first end 902 via an inner air communication connection line 904 with the fluid junction 50'''. The rapid on-boarding control valve system 900 is further fluidly coupled on a second end 906 via an outer air communication connection line 908 with the auxiliary air communication port connection device 940. In the example embodiment, the rapid on-boarding control valve system 900 is operable to selectively fluid couple the inner air communication connection line 904 with the outer air communication connection line 908 responsive to the auxiliary air communication port connection device 940 being supplied an extra-vehicular on-boarding air supply B' from the associated compressed air processing apparatus B for delivery to the tire inflation system 930.

Preferably, the rapid on-boarding control valve system 900 comprises a check valve 230" permitting a unidirectional on-boarding air flow from the outer air communication connection line 908 to the inner air communication connection line 904 for delivery of the extra-vehicular on-boarding air supply B' from the associated compressed air producing apparatus B to the tire inflation system 930. Also preferably the rapid on-boarding control valve system 900 comprises an on-boarded air pressure relief valve 260''' in operative fluid communication with one or more of the tire inflation connection line 936, the inner air communication connection line 904, and/or the outer air communication connection line 908, wherein the on-boarded air pressure relief valve 260''' is operable to limit pressure within the one or more of the tire inflation connection line 936, the inner air communication connection line 904, and/or the outer air communication connection line 908 to less than a predetermined on-boarded air pressure limit. In accordance with an example embodiment, the predetermined on-boarded air pressure limit is about 9 bar. In that way, the on-boarded air pressure relief valve 260''' operates to limit pressure within the one or more of the tire inflation connection line 936, the inner air communication connection line 904, and/or the outer air communication connection line 908 to less than an on-boarded air pressure limit of about 9 bar.

A charging valve device 960 is disposed in the on-board compressed air source connection line 926 between the junction connection device 50''' and the work vehicle compressor 920 as shown. The charging valve device 960 of the example embodiment comprises a forward pressure relief portion 962 operable to prevent a flow of air having a pressure less than a predetermined pressure level through the charging valve device 960 towards the tire inflation junction connection device 50''', and a reverse flow check valve portion 964 operable to prevent a flow of air through the charging valve device 960 towards the work vehicle compressor 920. In the example embodiment, the predetermined pressure is set to about 7 bar. In that way, delivery of the compressed air from the compressor 920 is prioritized to a work vehicle air trailer brake system 970. After the pressure at the work vehicle air trailer brake system 970 reaches the predetermined pressure such as about 7 bar for example as determined by the charging valve device 960 by sensing the pressure at a connection node 980, air may be delivered to the TIS 30. As shown, the fluid coupling of the work vehicle air trailer brake system 970 with the on-board compressed air source connection line 926 in this position at the connection node 980 between the work vehicle compressor 920 and the charging valve device 960 ensures a priority of delivery of the local compressed air supply 924 generated by the work vehicle compressor 920 to the work vehicle air trailer brake system 970 above delivery to the tire inflation system 930 for distribution to tires of the associated work vehicle.

It is to be appreciated that the work vehicle air trailer brake system 970 shown in the Figure forms no part of the subject rapid on-boarding control valve system 900 but rather is part of the associated work vehicle 1 and is illustrated to show an environment in which the rapid on-boarding control valve system 900 may operate. In the overall environment as shown, the work vehicle air trailer brake system 970 receives pressurized air from the work vehicle compressor 920. The work vehicle air trailer brake system 970 is fluidly coupled with the on-board compressed air source connection line 926 between the work vehicle compressor 920 and the charging valve device 960. As shown, the fluid coupling of the work vehicle air trailer brake system 970 with the on-board compressed air source connection line 926 between the work vehicle compressor 920 and the charging valve device 960 ensures a priority of delivery of the local compressed air supply 924 generated by the work vehicle compressor 920 to the work vehicle air trailer brake system 970 above delivery to the tire inflation system 930 for distribution to tires of the associated work vehicle 1.

The dual source air delivery system 10'' further includes an air conditioning system 250'' operable to condition the extra-vehicular on-boarding air supply B' flowing through one or more of the tire inflation connection line 936, the inner air communication connection line 904, and/or the outer air communication connection line 908. The air conditioning system 250'' may condition the extra-vehicular on-boarding air supply B' for example by filtering the extra-vehicular on-boarding air supply B' to impede ingress of one or more undesirable materials into the tire inflation system 930. Such undesirable materials may include for example moisture and/or other contaminants. The air conditioning system 250'' may further condition the extra-vehicular on-boarding air supply B' for example by adding a supplemental material into the extra-vehicular on-boarding air supply B'. Such supplemental materials may include for example sealants that may be useful to help to maintaining pressure within the tires of the associated work vehicle and/or to help maintain the integrity of joints, seals or the like of the TIS 930. Such supplemental materials may further include for example lubricants, solvents, cleaners or the like that may be useful in helping to maintain the TIS 930 and/or the tires of the work vehicle. In further example embodiments the air conditioning system 250'' may condition the extra-vehicular on-boarding air supply B' for example by both filtering the extra-vehicular on-boarding air supply B' to impede the ingress of one or more undesirable materials into the tire inflation system 930, and adding a supplemental material into the extra-vehicular on-boarding air supply B'.

In the example shown, the air conditioning system 250'' comprises an air dryer 500'' operable to remove moisture from the extra-vehicular on-boarding air supply B' flowing through one or more of the tire inflation connection line 936, the inner air communication connection line 904, and/or the outer air communication connection line 908. The air dryer 500'' as shown includes a liquid separator device 502'', and a coalescing filter device 504''. As shown, the liquid separator device 502'' and the coalescing filter device 504'' are arranged serially along the path of the on-boarding air flow for removing moisture therefrom for assisting in maintaining a dry atmosphere in the dual source air delivery system 10'' and in particular in the TIS 930. It is to be appreciated however that arrangements and configurations other than the series arrangement as shown may be used as necessary or desired to help remove moisture from the on-boarding air supply B' in order to help with assisting in maintaining a dry atmosphere in the dual source air delivery system 10'' and in particular in the TIS 930. In addition, it is to be appreciated that the air dryer 500'' of the particular example embodiment may include one or more of the liquid separator device 502'' and/or the coalescing filter device 504''.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Without in any way limiting the scope, interpretation, or application of the claims appearing below, a technical effect of one or more of the example embodiments disclosed herein is that an extra-vehicular off-boarded compressed air product may be provided from a local compressed air supply to an auxiliary air communication port connection device for off-boarding the extra-vehicular compressed air product relative to an associated work vehicle. Another technical effect of one or more of the example embodiments disclosed herein is that the off-boarded extra-vehicular compressed air product may be used to pneumatically power one or more mechanisms on an implement attached with the associated work vehicle. Another technical effect of one or more of the example embodiments disclosed herein is that an extra-vehicular on-boarding air supply may be provided from an auxiliary air communication port connection device to a tire inflation input air supply for on-boarding the extra-vehicular compressed air product relative to an associated work vehicle. Another technical effect of one or more of the example embodiments disclosed herein is that the on-boarded extra-vehicular compressed air product may be used to quickly inflate one or more tires of the associated work vehicle.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A bi-directional air delivery system for on-boarding and off-boarding an extra-vehicular compressed air product relative to a work vehicle, the system comprising:
 a work vehicle compressor configured to generate a local compressed air supply;
 a tire inflation system configured to receive a tire inflation input air supply and to distribute the received tire inflation input air supply to a plurality of tires of the work vehicle;
 an auxiliary air communication port connection device configured to provide a fluid coupling to the bi-directional air delivery system; and
 a bi-directional valve system configured to communicate:
  an extra-vehicular off-boarding air supply from the local compressed air supply to the auxiliary air communication port connection device; and
  an extra-vehicular on-boarding air supply from the auxiliary air communication port connection device to the tire inflation input air supply.

2. The bi-directional air delivery system according to claim 1, further comprising:
 an on-board compressed air source connection line, wherein the work vehicle compressor is configured to compress a first supply of air and to output the local compressed air supply to the on-board compressed air source connection line;
 a tire inflation connection line, wherein the tire inflation system is configured to regulate an air pressure within the plurality of tires of the work vehicle by selectively increasing and decreasing the air pressure within the plurality of tires of the work vehicle, wherein the tire inflation system is configured to distribute the tire inflation input air supply received by the tire inflation system to the plurality of tires using the tire inflation connection line;
 an inner air communication connection line fluidly coupling a first end of the bi-directional valve system with the on-board compressed air source connection line and with the tire inflation connection line; and
 an outer air communication connection line fluidly coupling a first end of the bi-directional valve system with the auxiliary air communication port connection device,
 wherein the auxiliary air communication port connection device is configured to selectively couple the bi-directional air delivery system with one or more compressed air processing apparatus for communicating the extra-vehicular compressed air product between the bi-directional air delivery system and the one or more compressed air processing apparatus,
 wherein the bi-directional valve system is operable to selectively fluid couple the inner air communication connection line with the outer air communication connection line responsive to:
  a bi-directional valve system control signal to permit the local compressed air supply to be delivered to the auxiliary air communication port connection device as the extra-vehicular off-boarding air supply; and
  the auxiliary air communication port connection device being supplied the extra-vehicular on-boarding air supply from the compressed air processing apparatus for delivery to the tire inflation system.

3. The bi-directional air delivery system according to claim 2, wherein:
 the bi-directional valve system comprises:
  a selector valve device responsive to the bi-directional valve system control signal to transition between a first configuration closing a flow between the inner air communication connection line and the outer air communication connection line and a second configuration opening the flow between the inner air communication connection line and the outer air communication connection line to permit the local compressed air supply to be delivered by the auxiliary air communication port connection device to a compressed air consuming apparatus as the extra-vehicular off-boarding air supply; and
  a check valve permitting a unidirectional on-boarding air flow from the outer air communication connection line to the inner air communication connection line for delivery of the extra-vehicular on-boarding air supply from a compressed air producing apparatus to the tire inflation system.

4. The bi-directional air delivery system according to claim 3, wherein the selector valve device comprises one or more of:
 a manual selector valve device operable in response to a position of a manual actuator device to transition the manual selector valve device between the first and second configurations; and/or
 an electric selector valve device operable in response to an electric control signal to transition the electric selector valve device between the first and second configurations.

5. The bi-directional air delivery system according to claim 2, further comprising:
 an air conditioning system operable to condition the extra-vehicular on-boarding air supply flowing through one or more of the tire inflation connection line, the inner air communication connection line, and/or the outer air communication connection line by one or more of:
  filtering the extra-vehicular on-boarding air supply to impede ingress of an undesirable material into the tire inflation system; and/or
  adding a supplemental material into the extra-vehicular on-boarding air supply.

6. The bi-directional air delivery system according to claim 5, wherein the air conditioning system comprises:
 an air dryer operable to remove moisture from the extra-vehicular on-boarding air supply flowing through one or more of the tire inflation connection line, the inner air communication connection line, and/or the outer air communication connection line, wherein the air dryer comprises one or more of:
  a liquid separator device; and/or
  a coalescing filter device.

7. The bi-directional air delivery system according to claim 2, wherein:
the bi-directional valve system comprises:
an on-boarded air pressure relief valve in fluid communication with one or more of the tire inflation connection line, the inner air communication connection line, and/or the outer air communication connection line,
wherein the on-boarded air pressure relief valve is operable to limit pressure within the one or more of the tire inflation connection line, the inner air communication connection line, and/or the outer air communication connection line to less than a predetermined on-boarded air pressure limit.

8. The bi-directional air delivery system according to claim 2, further comprising:
a junction connection device fluid coupling the on-board compressed air source connection line with the tire inflation and inner air communication connection lines.

9. The bi-directional air delivery system according to claim 2, further comprising:
an on-boarded air pressure relief valve in fluid communication with one or more of the tire inflation connection line, the inner air communication connection line, and/or the outer air communication connection line,
wherein the on-boarded air pressure relief valve is operable to limit pressure within the one or more of the tire inflation connection line, the inner air communication connection line, and/or the outer air communication connection line to less than a predetermined on-boarded air pressure limit.

10. The bi-directional air delivery system according to claim 2, further comprising:
a charging valve device disposed in the on-board compressed air source connection line between the junction connection device and the work vehicle compressor, the charging valve device comprising:
a forward pressure relief portion operable to prevent a flow of air having a pressure less than a predetermined pressure level through the charging valve device towards the tire inflation junction connection device; and
a reverse flow check valve portion operable to prevent a flow of air through the charging valve device towards the work vehicle compressor.

11. The bi-directional air delivery system according to claim 10, further comprising:
a work vehicle air trailer brake system receiving pressurized air from the work vehicle compressor, the work vehicle air trailer brake system being fluidly coupled with the on-board compressed air source connection line between the work vehicle compressor and the charging valve device,
wherein the fluid coupling of the work vehicle air trailer brake system with the on-board compressed air source connection line between the work vehicle compressor and the charging valve device ensures a priority of delivery of the local compressed air supply generated by the work vehicle compressor to the work vehicle air trailer brake system above delivery to:
the tire inflation system for distribution to the plurality of tires of the work vehicle; and/or
the bi-directional valve system for communication to the auxiliary air communication port connection device as the extra-vehicular off-boarding air supply.

12. A bi-directional air delivery retrofit apparatus for providing on-boarding and off-boarding of an extra-vehicular compressed air product relative to a work vehicle including a work vehicle compressor configured to compress a first supply of air and to output a local compressed air supply to an on-board compressed air source connection line, and a tire inflation system configured to regulate an air pressure within a plurality of tires of the work vehicle by selectively increasing and decreasing the air pressure within the plurality of tires of the work vehicle and to distribute to the plurality of tires of the work vehicle a tire inflation input air supply received by the tire inflation system at a tire inflation connection line in fluid communication with the tire inflation system, the retrofit apparatus comprising:
a junction connection device configured to be selectively coupled with the on-board compressed air source connection line and the tire inflation connection line;
an auxiliary air communication port connection device configured to be mounted on the work vehicle and to selectively couple the retrofit apparatus with one or more compressed air processing apparatus for communicating an extra-vehicular compressed air product between the retrofit apparatus and the one or more compressed air processing apparatus; and
a bi-directional valve system fluidly coupled on a first end thereof with the junction connection device by an inner air communication connection, and fluidly coupled on a second end thereof with the auxiliary air communication port connection device by an outer air communication connection, wherein the bi-directional valve system is operable to selectively fluid couple the inner air communication connection line with the outer air communication connection line responsive to:
a bi-directional valve system control signal to permit the local compressed air supply to be delivered by the auxiliary air communication port connection device to the compressed air processing apparatus as an extra-vehicular off-boarding air supply; and
the auxiliary air communication port connection device being supplied an extra-vehicular on-boarding air supply from the compressed air processing apparatus for delivery to the tire inflation system.

13. The bi-directional retrofit apparatus according to claim 12, wherein:
the bi-directional valve system comprises:
a selector valve device responsive to the bi-directional valve system control signal to transition between a first configuration closing a flow between the inner air communication connection line and the outer air communication connection line and a second configuration opening the flow between the inner air communication connection line and the outer air communication connection line to permit the local compressed air supply to be delivered by the auxiliary air communication port connection device to a compressed air consuming apparatus as the extra-vehicular off-boarding air supply; and
a check valve permitting a unidirectional on-boarding air flow from the outer air communication connection line to the inner air communication connection line for delivery of the extra-vehicular on-boarding air supply from a compressed air producing apparatus to the tire inflation system.

14. The bi-directional retrofit apparatus according to claim 13, wherein:
the selector valve device comprises a manual selector valve device operable in response to a position of a manual actuator device to transition the manual selector valve device between the first and second configurations.

15. The bi-directional retrofit apparatus according to claim 13, wherein:
the selector valve device comprises an electric selector valve device operable in response to an electric control signal to transition the electric selector valve device between the first and second configurations.

16. The bi-directional retrofit apparatus according to claim 12, further comprising:
an air conditioning system operable to condition the extra-vehicular on-boarding air supply flowing through one or more of the tire inflation connection line, the inner air communication connection line, and/or the outer air communication connection line by one or more of:
filtering the extra-vehicular on-boarding air supply to impede ingress of an undesirable material into the tire inflation system; and/or
adding a supplemental material into the extra-vehicular on-boarding air supply.

17. The bi-directional retrofit apparatus according to claim 16, wherein the air conditioning system comprises:
an air dryer operable to remove moisture from the extra-vehicular on-boarding air supply flowing through one or more of the tire inflation connection line, the inner air communication connection line, and/or the outer air communication connection line, wherein the air dryer comprises one or more of:
a liquid separator device; and/or
a coalescing filter device.

18. The bi-directional retrofit apparatus according to claim 12, wherein:
the bi-directional valve system comprises:
an on-boarded air pressure relief valve in fluid communication with one or more of the tire inflation connection line, the inner air communication connection line, and/or the outer air communication connection line,
wherein the on-boarded air pressure relief valve is operable to limit pressure within the one or more of the tire inflation connection line, the inner air communication connection line, and/or the outer air communication connection line to less than a predetermined on-boarded air pressure limit.

19. A dual source air delivery system for use with a work vehicle, comprising:
a work vehicle compressor configured to be mounted on the work vehicle and to compress a first supply of air and to output a local compressed air supply to an on-board compressed air source connection line;
a tire inflation system configured to be mounted on the work vehicle and to regulate an air pressure within one or more tires of the work vehicle by selectively increasing and decreasing the air pressure within the one or more tires of the work vehicle, wherein the tire inflation system is configured to distribute to the one or more tires of the work vehicle a tire inflation input air supply received by the tire inflation system by a tire inflation connection line;
an auxiliary air communication port connection device configured to be mounted on the work vehicle and to selectively couple the dual source air delivery system with a compressed air producing apparatus for communicating an extra-vehicular compressed air product from the compressed air producing apparatus to the dual source air delivery system;
a pressurized air storage device fluidly coupled with the tire inflation connection line, the pressurized air storage device being operable to store compressed air received by the pressurized air storage device, and to pay out the stored compressed air to the tire inflation system for selective distribution to the one or more tires of the work vehicle as the tire inflation input air supply;
a fluid junction operatively fluidly coupled with the on-board compressed air source connection line with the tire inflation connection line; and
a rapid on-boarding control valve system fluidly coupled on a first end thereof with the fluid junction by an inner air communication connection line, and fluidly coupled on a second end thereof with the auxiliary air communication port connection device by an outer air communication connection line, wherein the rapid on-boarding control valve system is operable to selectively fluid couple the inner air communication connection line with the outer air communication connection line responsive to the auxiliary air communication port connection device being supplied an extra-vehicular on-boarding air supply from the compressed air processing apparatus for delivery to the tire inflation system, wherein the rapid on-boarding control valve system comprises:
a check valve permitting a unidirectional on-boarding air flow from the outer air communication connection line to the inner air communication connection line for delivery of the extra-vehicular on-boarding air supply from the compressed air producing apparatus to the tire inflation system; and
an on-boarded air pressure relief valve in operative fluid communication with one or more of the tire inflation connection line, the inner air communication connection line, and/or the outer air communication connection line, wherein the on-boarded air pressure relief valve is operable to limit pressure within the one or more of the tire inflation connection line, the inner air communication connection line, and/or the outer air communication connection line to less than a predetermined on-boarded air pressure limit.

20. The dual source air delivery system according to claim 19, further comprising:
a charging valve device disposed in the on-board compressed air source connection line between the junction connection device and the work vehicle compressor, the charging valve device comprising:
a forward pressure relief portion operable to prevent a flow of air having a pressure less than a predetermined pressure level through the charging valve device towards the tire inflation junction connection device; and
a reverse flow check valve portion operable to prevent a flow of air through the charging valve device towards the work vehicle compressor; and
an air conditioning system operable to condition the extra-vehicular on-boarding air supply flowing through one or more of the tire inflation connection line, the inner air communication connection line, and/or the outer air communication connection line by one or more of:
filtering the extra-vehicular on-boarding air supply to impede ingress of an undesirable material into the tire inflation system; and/or adding a supplemental material into the extra-vehicular on-boarding air supply.

* * * * *